United States Patent
Barajas et al.

(10) Patent No.: US 10,058,212 B2
(45) Date of Patent: Aug. 28, 2018

(54) BARBECUE GRILL HEATING AND SMOKING PLATES AND METHOD

(71) Applicants: Wilfrido Barajas, Riverside, CA (US); Sherman Lin, Chino Hills, CA (US)

(72) Inventors: Wilfrido Barajas, Riverside, CA (US); Sherman Lin, Chino Hills, CA (US)

(73) Assignee: Nexgrill Industries, Inc., Chino, CA (US)

( * ) Notice: Subject to any disclaimer, the term of this patent is extended or adjusted under 35 U.S.C. 154(b) by 224 days.

(21) Appl. No.: 14/881,449

(22) Filed: Nov. 10, 2015

(65) Prior Publication Data

US 2017/0130966 A1    May 11, 2017

(51) Int. Cl.
| | | |
|---|---|---|
| *F24C 15/10* | (2006.01) | |
| *F24B 1/193* | (2006.01) | |
| *F24B 13/02* | (2006.01) | |
| *A47J 37/07* | (2006.01) | |
| *A47J 37/06* | (2006.01) | |

(52) U.S. Cl.
CPC ........... *A47J 37/0713* (2013.01); *A47J 37/07* (2013.01); *F24B 1/193* (2013.01); *F24B 13/02* (2013.01); *F24C 15/107* (2013.01); *A47J 37/0694* (2013.01)

(58) Field of Classification Search
CPC ........ F24C 15/107; F24B 1/193; F24B 13/02; A47J 37/07; A47J 37/0694
USPC ........................... 126/25 R, 29, 30, 167, 168
IPC ............. F24C 15/10; F24B 1/193,13/02; A47J 37/07
See application file for complete search history.

(56) References Cited

U.S. PATENT DOCUMENTS

| | | | | |
|---|---|---|---|---|
| 2,173,166 | A * | 9/1939 | Hoelseher | F24B 1/202 126/25 R |
| 3,003,494 | A * | 10/1961 | Ross | A47J 37/07 126/25 A |
| 3,683,791 | A * | 8/1972 | Rast, Jr. | A47J 37/0704 126/25 R |
| 4,037,580 | A * | 7/1977 | Angelo | A47J 37/0704 126/25 R |
| 5,031,602 | A * | 7/1991 | Vick | A47J 37/0713 126/1 AA |

(Continued)

FOREIGN PATENT DOCUMENTS

| | | | | |
|---|---|---|---|---|
| CA | 2171912 A1 * | 9/1997 | ......... | A47J 37/0713 |
| CA | 2935170 A1 * | 1/2017 | ............. | A47J 37/07 |

(Continued)

OTHER PUBLICATIONS

"DEFINITION—Plate.pdf", The New Lexicon Webster's Encyclopedic Dictionary of the English Language, p. 769, 1991.*

*Primary Examiner* — Gregory Huson
*Assistant Examiner* — Daniel E Namay
(74) *Attorney, Agent, or Firm* — Thomas W. Cook

(57) ABSTRACT

A cooking grill with apparatus by which food may be cooked using direct convective heat, indirect radiative heat, broiling (direct radiative heat), and smoking features as well as the method for transforming the grill to use any one of these cooking features, or combinations of these cooking pictures, at any given time is disclosed. The method of heating employed depends on the placement of one or more movable and removable heat plates of the present invention with respect to the grid or grids of the grill. The grill of the present invention provides versatility in introducing a grill with a plurality of cooking systems as well as grill cooking methods.

17 Claims, 9 Drawing Sheets

(56) References Cited

U.S. PATENT DOCUMENTS

| | | | | |
|---|---|---|---|---|
| 5,099,821 A * | 3/1992 | Ceravolo | A47J 37/07 | 126/242 |
| 5,638,808 A * | 6/1997 | Home | A47J 37/0713 | 126/25 R |
| 5,782,166 A * | 7/1998 | Lin | A47J 37/0713 | 126/25 R |
| 6,065,464 A * | 5/2000 | Zajec | A47J 37/0786 | 126/25 B |
| 6,143,341 A * | 11/2000 | Sikes | A47J 37/07 | 126/369.1 |
| 6,736,050 B1 * | 5/2004 | Monn | A47J 37/0704 | 126/25 R |
| 7,793,649 B2 * | 9/2010 | Barkhouse | F23N 1/002 | 126/19 R |
| 7,853,129 B2 | 12/2010 | Best | | |
| 8,261,731 B2 * | 9/2012 | Marsh | A47J 37/0763 | 126/25 R |
| 8,893,703 B2 * | 11/2014 | DeFoort | F24B 1/202 | 126/25 R |
| 9,844,300 B2 * | 12/2017 | Cedar | A47J 37/0754 | |
| 2003/0075166 A1 * | 4/2003 | Glass | A47J 37/0704 | 126/506 |
| 2004/0094142 A1 * | 5/2004 | Christensen | A47J 37/067 | 126/41 R |
| 2007/0221191 A1 * | 9/2007 | O'Brien | A47J 37/0713 | 126/25 R |
| 2009/0020109 A1 * | 1/2009 | Rheault | A47J 33/00 | 126/25 R |
| 2009/0025574 A1 * | 1/2009 | Byrnes | A47J 37/0704 | 99/447 |
| 2009/0126714 A1 * | 5/2009 | Barkhouse | F23N 1/002 | 126/39 G |
| 2009/0183729 A1 * | 7/2009 | Barkhouse | A47J 27/62 | 126/39 BA |
| 2009/0308373 A1 * | 12/2009 | Scott | A47J 36/06 | 126/25 R |
| 2009/0314285 A1 * | 12/2009 | Marsh | A47J 37/0763 | 126/9 R |
| 2010/0132689 A1 * | 6/2010 | Contarino, Jr. | A47J 37/067 | 126/25 B |
| 2010/0218754 A1 * | 9/2010 | Kuntz | A47J 37/0786 | 126/25 R |
| 2011/0088682 A1 * | 4/2011 | Barkhouse | F23N 1/002 | 126/39 G |
| 2011/0126820 A1 * | 6/2011 | Barkhouse | F23N 1/002 | 126/25 R |
| 2012/0255538 A1 * | 10/2012 | Merritt | A47J 37/06 | 126/25 R |
| 2013/0206016 A1 * | 8/2013 | Diaz | A47J 37/07 | 99/339 |
| 2013/0228161 A1 * | 9/2013 | Ahmed | A47J 37/0727 | 126/25 R |
| 2013/0312732 A1 * | 11/2013 | Brennan | A47J 37/07 | 126/25 R |
| 2014/0116411 A1 * | 5/2014 | Jewett | F24B 1/195 | 126/19 R |
| 2014/0137854 A1 * | 5/2014 | Roberts | A47J 37/0786 | 126/25 R |
| 2014/0161952 A1 * | 6/2014 | Sykes | A47J 37/0611 | 426/523 |
| 2014/0326233 A1 * | 11/2014 | Traeger | A47J 37/0704 | 126/25 R |
| 2014/0360385 A1 * | 12/2014 | Cammon | A47J 37/0704 | 99/445 |
| 2015/0201804 A1 * | 7/2015 | Liao | A47J 37/0763 | 99/445 |
| 2015/0201805 A1 * | 7/2015 | Cedar | A47J 37/0754 | 126/25 R |
| 2015/0265100 A1 * | 9/2015 | Yang | A47J 37/0763 | 126/25 R |
| 2016/0174766 A1 * | 6/2016 | Schlosser | A47J 37/0704 | 126/25 R |
| 2016/0174767 A1 * | 6/2016 | Schlosser | A47J 37/0704 | 126/25 R |
| 2017/0130966 A1 * | 5/2017 | Barajas | F24C 15/107 | |

FOREIGN PATENT DOCUMENTS

| | | | | |
|---|---|---|---|---|
| DE | 102012007506 A1 * | 10/2013 | | A47J 37/04 |
| DE | 102015122742 A1 * | 6/2017 | | A47J 37/07 |
| EP | 0857448 A1 * | 8/1998 | | A47J 37/0694 |
| EP | 1332703 A1 * | 8/2003 | | A47J 37/0704 |
| FR | 2584912 A1 * | 1/1987 | | A47J 37/0763 |
| WO | WO 9915058 A1 * | 4/1999 | | A47J 37/07 |

\* cited by examiner

BARBECUE GRILL HEATING AND SMOKING PLATES AND METHOD

CROSS-REFERENCE TO RELATED APPLICATIONS

Not Applicable.

STATEMENT REGARDING FEDERALLY SPONSORED RESEARCH OR DEVELOPMENT.

Not Applicable.

THE NAMES OF THE PARTIES TO A JOINT RESEARCH AGREEMENT Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR.

Not Applicable.

TECHNICAL FIELD

The present invention generally relates to the field of grill and barbecue-type cooking. More specifically, the present invention relates to a cooking grill apparatus having capabilities for direct heating cooking, indirect heating cooking, broiling or smoking on single and multiple surface cooking zones.

BACKGROUND

Grilling is an all-time favorite activity that has made an indelible mark on cultural traditions in the U.S. especially during holidays such as the Fourth of July, Memorial Day, and Labor Day. Cooking grills are popular for consumers who are avid barbecuers and cookers, as such users may grill burgers and steaks on holidays and all-year round. A variety of cooking grill apparatus exist in the current market, but no grill allows consumers to expand the methods of cooking on their grills, or allows various cooking systems, such as using either direct heating cooking or broiling. For example, if consumers purchase a cooking grill using a direct convective heating cooking system, they cannot use the same grill to cook using primarily radiation, and they cannot transform their pre-existing grill to an indirect heating, radiative cooking system. Consumers are limited in the ways their food may be prepared on a grill, depending on the grill they have.

Direct heating cooking is one of the more common standard cooking systems found in grills in the market. To employ direct heating cooking, the grill is configured by placing a charcoal, electric, or gas heat source directly under the grid on which the food is placed. Heat from one of these heat sources then proceeds by convection to and around the food (and then, typically, out of the grill through a vent in a movable cover). Cooking grills using the standard cooking system of direct heating cooking cannot be transformed easily to indirect, radiative heating cooking, or cooking by direct contact with the food. While direct heating cooking is advantageous for steaks and burgers, such heating may be a disadvantage for consumers wanting to cook smaller foods such as chicken breasts or fish fillets, or larger or very firm foods such as briskets or ribs that would burn if cooked on a grill using direct heating cooking.

Indirect, radiative heating cooking is also a cooking system found in grills in the markets. Radiative heating cooking in a direct heating (convective) system arises because the hood and other parts are warm, or because a user has placed a special-purpose "oven" within their existing grill. However, not all types of food grill well using indirect heating cooking, and convective heating grills do not employ structural elements which also easily allow indirect heating. For example, indirect heating cooking is not well suited for some meats because such meats require additional heat, which benefit from the "sear" created by the higher heat that can be achieved by direct heating cooking. The "ovens" of existing systems, such as the grill disclosed in U.S. Pat. No. 7,853,129 to Char-Broil, are cumbersome and single-purpose devices. Consumers cannot purchase a grill, or transform their grill, or use direct heating cooking if they have an indirect heating system. Therefore, they are limited in the types of food they can prepare, and the effects they can achieve, with a grill using indirect heating cooking.

Broiling is another type of "direct" cooking system found in most ovens, wherein the user places food directly on a grill or on a "grill topper," with radiative heat directed at the food from above or below. Grill toppers are popular accessories that prevent delicate foods such as seafood and vegetables from falling through a grid during cooking. Grill toppers are placed above the grid and are generally comprised of perforated metal in which the heat is directed from a heat source above or adjacent to the food to be cooked. Broiling can direct intense heat at the food from a heat source directly above the food to be cooked, to quickly sear and cook the food. However, grills are not capable of broiling in the same way an oven can, as an oven is set up with special purpose, overhead burners. Conversely, an oven cooking system configured for broiling cannot be physically transformed to use other types of cooking systems, such as indirect, radiative heating cooking, and therefore such systems are limited in versatility when cooking foods of varying thickness and texture.

Smoking is another popular type of cooking system found in grills. Smoking flavors foods, utilizing barbecue grilling accessories such as smoker boxes. To smoke foods, consumers use these smoker boxes which are popular accessories for grills. In a smoking cooking system, the grill is generally set up so that a smoker box containing wood chips is positioned beside or underneath the barbecue grid such that, when the smoker box is heated, both the flavoring smoke and moistening vapors produced in the box circulate upwards to heat and flavor the food on the grid. Typically, wood chips with various food flavoring effects are placed in the smoker box, and the box then generates smoke when it is heated by the heat source. However, like other grills, grills using a smoking cooking system (with, generally, direct convective heat) is restricted in functional capability to direct convective grilling and smoking. Food cooked on smoking-capable grills cannot be broiled or indirectly heated.

Grills manufacturers have created grilling systems in attempts to address the shortcomings of single-purpose grills, and one such system may be found in U.S. Pat. No. 7,853,129. However, the grill system disclosed in this reference suffers from one or more the following disadvantages: inability to transform the grills to cooking using direct heating, broiling, or smoking. The apparatus disclosed in U.S. Pat. No. 7,853,129 is for cooking with infrared radiation and, more particularly, indirect radiative heating. The apparatus includes infrared energy emitters which are configured above the burner units and below the grids. As a result, consumers are unable to configure the grill of U.S. Pat. No. 7,853,129 to use various types of cooking systems, because consumers are limited to preparation and use of the indirect heating cooking system as directed.

For the foregoing reasons, there is a need in the market for versatility in grill cooking methods. The grill of the present invention provides just such versatility by introducing a grill with a plurality of cooking systems in which one grill is capable of using each of these four cooking methods: direct convective cooking, indirect radiative energy, broiling, and smoking.

BRIEF SUMMARY OF THE INVENTION

The present invention is directed to a cooking grill that satisfies the need for various methods for cooking foods by providing a grill with apparatus by which food may be cooked using direct convective heat, indirect radiative heat, broiling (direct radiative heat), and smoking (in conjunction with one or more of the aforementioned methods). The methods of heating employed, as chosen by a cook, depends on the placement of one or more heat plates of the present invention with respect to the grid or grids of the grill. In some applications, the heat plate of the present invention may be used to transform grills of standard design to direct or indirect heating, broiling, or smoking. The apparatus of the present invention comprises a grill with a grid, a movable (and removable) heat plate which may be interposed above or below the grid, and structures by which the heat plate may be positioned, including structures by which the heat plate may be positioned on the same ledge, bracket, or shelf which supports the grid. For some cooking jobs, the apparatus of the present invention may also include a partition ("divider" and divider brackets) which separates the multiple grids and heat plates in a multiple grid-and-heat-plate grill arrangement.

This cooking grill provides versatile features for four cooking methods: Direct convective heating cooking, Indirect radiative heating cooking, Broiling (direct radiative heating), and a Smoker capability (the four methods collectively referred herein by the acronym "DIBS"). The DIBS cooking grill can utilize any one of these four cooking methods at any given time, or multiple methods, by interposing one or more heat plates below or above the grid or grids, or on the same ledge, bracket or shelf which positions the grid or grids, and by using one or more dividers which break the grill cooking area into separate cooking zones.

The DIBS cooking grill uses a charcoal, electric, or gas heat source. The DIBS grill may also employ a standard burner assembly, with a firebox, and, generally, a "flame tamer," at least one grid, and at least one movable (and removable) heat plate. In a preferred embodiment of the present invention, the heat plate or heat plates are made from stainless steel, or cast iron, to protect the burner from corrosive drippings, and to disperse heat, as well as to direct heat within the grill. The heat plates of the DIBS grill can also be made from other types of metal such as heavy gauge aluminum, or other metals, and it can be coated in enamel for further protection.

Direct convective heating cooking is the standard cooking system found on grills. Convection in a grill occurs when heat is carried from the heat source to the food that is being grilled. Air acts as the carrier for the heat transfer, natural or forced convection (such as air stirred by a fan) circulates the heated air to cook the food. Heat from a heat source, such as charcoal, electric, or gas, then proceeds by convection to and around the food (and then, typically, out of the grill through a vent in a movable cover). The food is cooked by allowing constantly heated air directly rising from the heat source to circulate evenly through the grid and within the grill.

For direct heating cooking, a preferred embodiment of the cooking grill of the present invention may comprise a standard burner assembly with a firebox and a flame tamer, and at least one grid. This preferred embodiment also includes at least one heat plate, however the heat plate is not directly employed in the grill when cooking by direct convective heat. The DIBS grill does, however, incorporate methods for holding one or more heat plates in position when not directly employed, generally on ledges, brackets or shelves formed in the interior of the side walls of the firebox, as explained more fully below. The firebox is a horizontally extending combustion chamber with four containment walls and a floor. The firebox is the chamber of the grill in which the fuel is burned. The burner is the essential heat source, and it is situated at or near the bottom of the firebox of the grill. The burner is positioned within the firebox to create heat evenly throughout the firebox. In some installations, the burner may rest directly on the grill firebox. The burner is typically cylindrical in shape although it may be of various shapes and sizes. Hollow, with gas outlet ports, the burner typically has a corresponding control knob. As is known in the field, the control panel can also include touch pads or the like that allow the user of the DIBS grill to individually control the temperature of the burner assemblies.

A horizontally extending flame spreader, or "flame tamer," is often positioned between the burner and the grid within the firebox to further spread and even the hot gases which arise from the burner within the firebox. Flame tamers are generally at least as long and as wide as the burner in order to protect the burner from corrosive meat drippings, and distribute heat evenly across the entire surface of the grilling grid. Flame tamers also catch and vaporize food drippings to flavor the food. One preferred embodiment of the present invention envisions the flame tamers to be made of stainless steel metal sheets that are folded into a continuous series of inverted V-tents which are supported by corresponding first brackets protruding from the interior of at least two of the vertical side walls on the inside of the firebox grill. These angled V-tents often also channel grease away from the burner. Flame tamers made from stainless steel will not rust or break under most extreme conditions. The flame tamer is often perforated with holes on the horizontal ends, or along the edges of the metal sheet, in order to distribute heat as evenly as possible.

The grill of the present invention also includes at least one grid, which may be positioned horizontally inside the firebox. The grid may be held in place by a bracket protruding from the interior of at least two side walls on the inside of the grill firebox. The grid may also be held in place by a shelf or shelves formed in the interior of the side walls of the firebox, or the grid may be held in place by other methods. In any case, the heat plate of the present invention (discussed below) may be positioned on the same bracket or shelf in the firebox, or on the grill, or it may be held in position using other means. The grid is preferably rectangular in shape. However, grids may take any shape, such as a square or circle, as long as the grids have adequate surface area to hold the food, and can be positioned on the brackets or shelf formed in the interior of the side walls of the firebox to prevent the grid from falling into the burner or flame tamer. The cooking surface of the grid is formed into a generally flat surface comprised of a plurality of generally elongate rail members assembled parallel to each other and equally spaced apart as they extend horizontally across the firebox. A preferred embodiment of the present invention envisions the grid to be made from stainless steel, or cast iron, an excellent conductor of heat, to withstand high temperatures and meat dripping which can cause corrosion.

Furthermore, the cooking grill may have a hinged lid, which closes or opens depending on the user's preference. With this direct convective heating set up, heat may be evenly dispersed from the flames emitted through or around the flame tamer so consumers can enjoy their grills to sear meats and cook hamburgers directly above the heat source, which is the most common way of grilling.

In this convective, direct heat, cooking configuration, a heat plate is not used for cooking because food is cooked directly above the heat source (only), consistent with the intentions of the user. One or more heat plates are, however, utilized in indirect radiative heating, broiling, and smoking (as discussed below). As we address those cooking methods, the heat plate, as the active, movable component by which the cooking method is varied, is the heart of the present invention. One or more heat plates may therefore be stored by the user in prospect of such use, either within another area of the firebox of the DIBS grill, or separately from the grill, when only direct convective heat is desired. A heat plate is a metal plate which rests above the burner, at various positions to create various heating effects. Such heat plate is the main, adjustable component of the DIBS cooking grill, and the heat plate may be placed above or below the grid of the grill, or filled with wood chips, depending on the desired type of cooking configuration. The heat plate, like the grid, extends horizontally across the firebox, and is generally as long and as wide as the grid in order to maximize heat plate effects, including dispersing heat evenly to all zones of the cooking surface. However, the heat plate may be of different size from the grid if other cooking effects are desired. Generally made from washable, stainless steel, porcelain, porcelain coated, anodized stainless steel, or other heat resistant materials, the heat plate is resistant to extreme, high temperatures, which can vaporize meat drippings, so that drippings do not build up on the plates themselves.

The surface area of the heat plate, in one preferred embodiment, is formed in a generally flat surface having a plurality of circular or elongated perforations ("holes"), formed generally in parallel or staggered rows and equally spaced from one another as they extend horizontally across the face of the heat plate. In this embodiment, the holes are sufficient in area to allow sufficient heat to rise and pass through the plate, and distribute heat, while forming a barrier between the burner and grid to protect the burner from food drippings and prevent grease from catching fire and burning the food which can add undesired flavor or smoke to the food.

At the same time, the heat plate is thick enough to carry significant heat to radiate the heat in most configurations of the DIBS grill, and the heat plate has enough surface area, despite its holes, to provide a significant surface to radiate its heat. The heat plate is also generally elongated and rectangular in surface area and shape. Useful dimensions for the surface area of the heat plate is 12-inches by 17.5-inches and 6-inches by 17.5-inches, however the heat plate may be larger or smaller than these dimensions, depending generally on the size of the firebox of the grill or its grids. The thickness of the heat plate is typically within the range of one to two millimeters, however the heat plate may be considerably thicker than this range if the user or manufacturer wishes to hold more heat, or increase the rigidity of the plate, or use coatings of various materials, and the plate may be thinner than this range so long as the plate is capable of holding its own weight within the firebox. The thickness of the heat plate may be chosen for the optimal desired effect given the cooking method at hand, such effects including conducting and dispersing heat evenly throughout the grill.

In many preferred embodiments of the present invention, the heat plate is formed so that its edges are bent. The precise angle and shape of the edges when bent allow a user to accomplish various functions. For instance, one or more bends along two opposing edges of the plate allow the plate to be dropped into position, and held in place, inside the DIBS grill. The metal of the edges of the plate in such position may sit on ledges formed in the interior sides of the firebox, or on brackets affixed to the interior sides of the firebox. Such ledges or brackets may be the same ledges or brackets upon which the grid of the DIBS grill sits for its support. In this first position, the heat plate can sit directly below the grid, and at a distance from the grid (the "plate depth") sufficient to accomplish the purposes set forth below. The plate depth is therefore governed by the angle of the bends at the opposing edges of the heat plate, and by the width of these supporting edge "sills" created by the bends along the edges of the heat plate. The shape of the supporting sills of the heat plate may therefore vary, both in the angle of the bends and the width of the heat plate sills, so long as the plate depth is generally at least sufficient to accomplish the various cooking methods described below. Of course, the heat plate may also be positioned on ledges or brackets separated from the grid supports, however such positioning will change the functioning of the heat plate within the DIBS grill.

Other edges of the heat plate may also be bent to accomplish other purposes. For instance, one or more bends along one or more edges of the plate allow the plate, in conjunction with the supporting sills, to create a volume within which wood chips may be held under the grid. The edges and sills of the plate may then extend between and beyond (above) the rail members of the grid, thereby creating separate zones on and above the grid for cooking using different methods. The volume created by two sills along opposing sides of the heat plate, and by two bent edges at least as deep as the plate depth along the remaining two sides of the heat plate, create a volume from which wood chips, which may be used when smoking foods, cannot escape until they are small enough to fall through the holes formed in the heat plate, or are transformed to ashes.

The holes in the heat plate may themselves be increased in size toward the periphery of the heat plate, or they may be elongated, generally for the purpose of allowing more convective heat to move through the plane occupied by the heat plate. The heat plate may be held in place by brackets extending from at least two side walls inside the grill firebox. It may be also held in place by shelves formed in the interior side walls of the firebox. Since direct heating requires convection to directly heat the food, the heat plates are not directly used when only direct convective heat is desired, and they may therefore be stored away for a direct convective heating set up, or when the grill is not in use. However, when multiple cooking methods are desirable, the user may use one or more heat plates in some portions of the DIBS grill, while dispensing with heat plates for direct convective cooking in other portions of the DIBS grill, as we explain below.

Indirect radiative heating cooking is a cooking system found in some grills. Indirect radiative heating places a physical metal barrier, such as a heat plate, between the food and a heat source like charcoal, electric, or gas, and not directly above lit charcoal, electric, or gas burners. This type of heating generates a more moderate temperature and therefore reduces the intensity of the heat by allowing the heat source to indirectly heat the food by the radiation of heat from the heat plate.

For indirect heating cooking, a preferred embodiment of the DIBS cooking grill may comprise a standard burner assembly with a firebox and a flame tamer, a grid, and a heat plate installed below the grid. All of these components except the heat plate may be set up in the same way they are set up for direct convective heat as noted above. As we noted above, the heat plate is the main component that defines the grill's current cooking method. Installment of the heat plate under the grid allows the consumer to add a second heat conductive layer to disperse heat evenly across the grid and more evenly throughout the grill, all whilst preventing the grease from catching fire and burning the food which can add undesired flavor or smoke to the food. In this position, the heat plate may extend across the firebox, as long and as wide as the grid under which it sits, in order to bring heat evenly, and generally at lower temperatures, to all zones of the cooking surface of the grid. In one preferred embodiment, the heat plate is held in place by one or more separate brackets extending from the interior side walls inside the grill and below the grid, and at the plate depth from the grid. In another preferred embodiment, the heat plate sits on the same shelves or brackets which hold the grid in place. This embodiment ensures the plate sits at one distance below the grid, at the plate depth. The heat plate above the burner allows the convection of the heat to cook the food which is not directly above the burner, as heat circulates around the heat plate to the food.

When preparing for cooking, the heat plate is positioned below the grid, with heat plate sills, positioned on the appropriate preformed shelves or brackets. The food is then placed on the grid, over the heat source. Heat from the heat source convects from the burner to the heat plate, which, because it is heated by such convection, radiates heat in turn upward and toward the grid and food. Typically, some heat then escapes out the grill through a vent in a moveable cover, or through radiation from the cover or firebox. The vent generally contains holes through which heat from the heat source escapes through the vent holes. For heat that remains inside the grill, the air acts as a carrier for the heat transfer. Natural or forced convection (such as air stirred by a fan) circulates the heat to cook the food. Heat from a heat source, such as charcoal, electric, or gas, then proceeds by convection to and around the heat plate. The heat plate then absorbs such heat, at which point the convection of heat from the burner raises the temperature of the heat plate, in the process transforming received heat to radiation. The heat plate then radiates the collected heat to its surroundings, including upwardly where the food is on the grid. The radiating heat warms the food on the grid, while some additional convective heat passes by or circulates around the heat plate to the food.

Broiling typically exposes food to direct radiative heating when the heat from a heat source, such as gas, directly heats the food from above the grid. However, broiling may involve high, intense heat coming from a source directly in contact with the food. Broiling rapidly heats the surface of the food, similar to frying, sautéing, or baking food, when the heat source emits a considerable amount of heat radiation. Broiling (either by direct radiative heating or frying or even sautéing or baking) in barbecue grills is a cooking system that does not currently exist in the market.

For broiling in a barbecue grill, a preferred embodiment of the cooking grill of the DIBS grill may comprise a standard burner assembly with a firebox and a flame tamer, a grid, and a heat plate installed directly above the grid. All of these components except the heat plate may be set up as they are set up for direct convective heat as noted above. Installment of the heat plate directly above the grid in a position to hold the cooking food, allows the consumer to cook a variety of foods, while eliminating the need of an additional grill topper accessory for this function. Consumers no longer need grill toppers when the present invention is used in its broiling (frying or even sautéing or baking) heating configuration. The heat plate of the DIBS grill, which defines the grill's current cooking method, may extend horizontally across the firebox, as long and as wide as the grid upon which it sits, in order to bring heat evenly to all zones of the cooking surface, which is now the upper surface of the heat plate sitting on the grid. In one preferred embodiment, the heat plate is held in place by the same shelf or bracket which holds the grid in place. In this position, the shelf edges of the heat plate resides on top of the edge portions of the grid, which in turn rest on the grid holding shelf or bracket. The positioning of the heat plate in this way ensures the heat plate sits at one distance above the grid, holding the cooking food, at the plate depth above the grid. Installment of the heat plate above the grid eliminates the need for grill toppers because it prevents smaller food items from falling through the grid while providing heat to cook a variety of food items, including breakfast foods, vegetables, and seafood.

Smoking food (or "smoker capability"), using smoker boxes, or setting wood chips directly on charcoal, humidifies the air within the air space surrounding the food as it is being cooked. Smoking is a form of indirect heating so food is placed next to, but not generally directly above, the heat source because of the physical barrier created by the smoker boxes in between the food and the heat source. Smoker boxes function within barbecue chambers to emit smoke and heat which circulates throughout the grill to infuse smoke flavor into the food whilst indirectly heating it. Moistening vapors are produced in conjunction with flavoring smoke when the smoker box is heated.

For the smoker capability, a preferred embodiment of the cooking grill of the DIBS grill may comprise a standard burner assembly with a firebox and a flame tamer, a grid, and a heat plate, with stored wood chips, installed below the grid. All of these components except the heat plate and wood chips may be set up in the same way they are set up for direct convective heating as noted above. The heat plate in this cooking method, is formed so that its edges are bent to allow the plate, in conjunction with supporting sills, to create volume within which wood chips may be held under the grid. This heat plate, which for smoking is positioned open side up and facing the grid above, again defines the grill's current cooking method. The heat plate may extend horizontally across the firebox, as long and as wide as the grid under which it sits, in order to bring heat and smoke evenly to all zones of the cooking surface of the grid. The volume created by the two sills along opposing sides of the heat plate, and by two bent edges as least as deep as the heat plate depth along the remaining two sides of the heat plate, create a volume from which wood chips, cannot escape until they are small enough to fall through the holes of the heat plate, or are transformed to ashes.

In one preferred embodiment, the heat plate is held in place by the same shelf or bracket which holds the grid in place. In this position, the shelf edges of the heat plate reside on the same shelf or bracket which holds the grid in place, and under the grid. This embodiment ensures the heat plate sits at one distance below the grid, at the plate depth, so that sufficient wood chips may be held in the volume created between the main body of the heat plate and the grid, and smoke produced by the wood chips inside the heat plate may rise up through the grid and around the food supported thereby to efficiently smoke the food. Heat released from the burner directly below the heat plate causes smoking particles to ignite and smolder. During this process, the smoke flavors the food being cooked on the grill.

The heat plate with stored wood chips is designed to limit the amount of airflow entering the enclosure in order to restrict oxygen to the smoking wood chips. This oxygen restriction causes the smoking wood chips to produce more smoke over a longer period of time without ignition. A number of factors play a role in determining the duration and, amount of smoke that is released from the heat plate, such as opening size, wall thickness, and material composition. With the smoker capability, installment of the heat plate with stored wood chips below the grid allows the consumer to smoke foods and add more wood and flavor to the foods.

Providing these four features of Direct convective heating cooking, Indirect radiative heating cooking, Broiling, and the Smoker capability, this versatile cooking DIBS grill can utilize any of these cooking methods, or combinations of these cooking methods, at any given time with the use of a divider. The DIBS grill is fabricated so one or more dividers may be placed under and between one or more grids. These dividers, which section the grill into multiple cooking surface zones, are secured under and between two or more separate grids, and one or more heat plates. The DIBS grill also includes one or more u-brackets fastened to the interior side walls of the firebox, or to its interior bottom, to secure the corresponding dividers vertically in proper fixed relationship to the grids (i.e. perpendicular to the horizontally positioned grids and generally between grids). The dividers can be made from cast iron, stainless, or any other durable and flame-resistant metal. Consumers can use dividers to isolate selected zones of the cooking grill and thereby restrict mixing of grilling liquids, food seasonings, foods grilled with different cooking methods, and the like.

In one embodiment, the DIBS cooking grill is configured to have at least two grilling zones adapted to direct convective heating cooking and indirect radiative heating cooking. The cooking grill in this configuration includes at least one divider which sections the grids into two cooking zones, secured between the left grid and right grid. On the left side of the divider, the cooking grill includes a standard burner assembly with a firebox and a flame tamer, and at least one grid. On the right side of the divider, the cooking grill includes a standard burner assembly with a firebox and a flame tamer, at least one grid, and at least one heat plate positioned below the grid. By employing grids and heat plates of different sizes, and adjusting dividers as desired, the cooking zones left and right may be of different sizes. The placement of the heat plate below the grid in the right zone of the grill allows indirect heating cooking, as much of the heat produced from the burner is directed to the heat plate, which then indirectly heats the food as explained above. The absence of a heat plate in the left zone of the grill allows direct convective cooking. Alternatively, the left grid can be configured to use indirect heating cooking and the right grid can be configured to use direct heating cooking, merely by moving the heat plate from its position on the right side of the grill to a comparable position in the left zone of the grill and adjusting the divider between left and right zones as necessary. Using this configuration of the multiple grid-and-heat plate DIBS grill, consumers simultaneously can cook their foods in one surface zone using direct heating cooking, while cooking in a surface zone using indirect radiative heating cooking on the other side of the divider. With other direct heating cooking systems, consumers cannot transform their grills to indirect heat, or combine direct and indirect heat cooking methods on a single grill, and for that reason consumers are limited in food preparation and must cook food using the direct cooking system only (or only one cooking method on a grill). However, the cooking grill of the present invention is versatile, so a user may switch to direct heating cooking by storing the heat plates in the grill, or indirect heating cooking by installing the heat plates under the grill, or broiling (or a smoker capability), even on the same (DIBS) grill at the same time.

In another embodiment, the DIBS cooking grill is configured to have at least two grilling zones adapted to direct convective heating cooking and broiling (direct heating by contact with the food). The cooking grill in this configuration includes at least one divider which sections the grid into two cooking zones, secured between the left grid and right grid. On the left side of the divider, the cooking grill includes a standard burner assembly with a firebox and a flame tamer, and at least one grid. With direct heating cooking, the left zone of the grid provides a surface for the exposure and grilling of food directly over the burner in the firebox. On the right side of the divider, the cooking grill includes a standard burner assembly with a firebox and a flame tamer, at least one grid, and at least one heat plate installed above the grid. By employing grids and heat plates of different sizes, and adjusting dividers as desired, the cooking zones left and right may be of different sizes. The installment of the heat plate above the grid in the right zone of the grill allows broiling, frying, sautéing, or baking the food on the heat plate, as explained above, in the right zone of the grill. At the same time, the absence of the heat plate in the left zone of the grill allows direct convective heating cooking as the heat directly cooks the food. Alternatively, each cooking surface on either side of the divider can be configured to adapt to direct heating cooking or broiling. Merely by moving the heat plate from its position on the right side of the grill to a comparable position in the left zone of the grill and adjusting the divider between left and right sides as necessary, the left grid can be configured to use broiling and the right grid can be configured to use direct heating cooking. Using this configuration, consumers can simultaneously cook their foods in one surface zone using direct heating cooking, while cooking in a surface zone of the DIBS grill using broiling on the other side of the divider of the DIBS grill. With other direct heating cooking systems, consumers cannot transform their directive convective heating grills to broiling, or combine direct heating and broiling methods on a single grill, and therefore consumers are limited in food preparation using these systems to a single cooking method. However, the cooking grill of the present invention introduces a plurality of cooking systems on a single grill, where consumers can transform their grills to direct heating, indirect heating, broiling feature, or smoker capability depending on the placement and size of the heat plates, the size of the grids employed, and the placement of the dividers.

In another embodiment, the DIBS cooking grill is configured to have at least two grilling zones adapted to direct convective heating cooking and the smoker capability. The cooking grill in this configuration includes at least one divider which sections the grid into two cooking zones, secured between the left grid and right grid. On the left side of the divider, the cooking grill includes a standard burner assembly with a firebox and a flame tamer, and at least one grid. The grid exposes the food to direct heating cooking when food is cooked on the left side of the grid. On the right side of the divider, the cooking grill includes a standard burner assembly with a firebox and a flame tamer, at least one grid, and at least one heat plate, with wood chips, positioned below the grid. By employing grids and heat plates of different sizes, and adjusting dividers as desired, the cooking zones left and right may be of different sizes.

In this embodiment of the DIBS grill, wood chips are laid on the heat plate, which is then placed beneath the grid. When the burner heats the heat plate, the wood chips char and produce smoke that exits the heat plate and interacts with food on the cooking grid, in the process noted above. At the same time, the absence of the heat plate in the left zone of the grill allows direct convective heating cooking as the heat directly cooks the food. Alternatively, merely by moving the heat plate from its position in the right zone of the grill to a comparable position in the left zone of the grill and adjusting the divider between left and right zones as necessary, the left grid can be configured to use smoking and the right grid can be configured to use direct heating cooking. Using this configuration, consumers simultaneously can cook and smoke their foods in one cooking zone using the smoker capability, while cooking in a cooking zone using the direct heating system on the other side of the divider. The cooking grill of the present invention creates flexibility for consumers to configure several heating methods such as direct heating cooking, indirect heating cooking, the broiling feature, or the smoker capability simply by installing heat plates above or below the grill, and by employing wood chips in some configurations. This facility to transform or combine cooking methods on a single DIBS grill is not available using other grills.

In another embodiment, the cooking grill is configured to have at least two grilling zones adapted to indirect radiative heating cooking and broiling. The cooking grill in this configuration includes at least one divider which sections the grid into two cooking zones; and is secured between the left grid and right grid. On the left side of the divider, the cooking grill includes a standard burner assembly with a firebox and a flame tamer, at least one grid, and at least one heat plate below the grid. The installment of the heat plate below the grid enhances cooking by mediating heat from the burner, thereby indirectly heating the food on the grid. On the right side of the divider, the cooking grill includes a standard burner assembly with a firebox and a flame tamer, at least one grid, and a heat plate above the grid. By employing grids and heat plates of different sizes, and adjusting dividers as desired, the cooking zones left and right may be of different sizes. The heat plate on the right side provides a cooking zone for broiling (frying, sautéing or baking) meats, poultry, fish, vegetables, and similar products of varying thickness in the process noted above. At the same time, the installment of the heat plate below the grid in the left zone enhances cooking through the use of indirect radiative heating. Alternatively, the left grid can be configured to use broiling and the right grid can be configured to use indirect radiative heating cooking, merely by adjusting the heat plate in their respective positions in the left zone of the grill and the right zone of the grill to employ a specific method of cooking, and adjusting the divider between left and right zones as necessary. Using this configuration, consumers simultaneously can cook their foods in one cooking zone using the broiling feature while cooking in a cooking zone using indirect radiative heating cooking system on the other side of the divider. The cooking grill of the present invention allows consumers to configure their grills to a multitude of heating methods such as direct heating cooking, indirect heating cooking, or broiling or a smoker capability, simply by installing heat plates above or below the grid, and by employing wood chips in some configurations. This facility to transform or combine cooking methods on a single DIBS grill is not available using other grills.

In yet another embodiment, the cooking grill is configured to have at least two grilling zones adapted to indirect radiative heating cooking and a smoker capability. The cooking grill in this configuration includes at least one divider which sections the grid into two cooking zones, secured between the left grid and right grid. On the left side of the divider, the cooking grill includes a standard burner assembly with a firebox and a flame tamer, at least one grid, and at least one heat plate below the grid. The grill's heat source such as the burner provides direct heat which is mediated into an indirect heat by the heat plate, which is selectively located between the food and the heat source. On the right side of the divider, the cooking grill includes a standard burner assembly with a firebox and a flame tamer, a least one grid, and at least one heat plate with stored wood chips underneath the grid. By employing grids and heat plates of different sizes, and adjusting dividers as desired, the cooking zones left and right may be of different sizes. When the heat plate in the right zone of the grill is heated by the burner, smoldering wood chips release smoke to enhance the flavors of the food on the grid in the process noted above. At the same time, the installment of the heat plate below the grid in the left zone enhances cooking through the use of indirect radiative heating. Using this configuration, consumers simultaneously can cook their foods in one cooking zone using the smoker capability, while cooking in a cooking zone using indirect heating cooking on the other side of the divider. Alternatively, the left grid can be configured to use smoking and the right grid can be configured to use indirect radiative heating cooking, merely by adjusting the heat plate in their respective positions in the left zone of the grill and the right zone of the grill to employ a specific method of cooking, and adjusting the divider between left and right sides as necessary. The cooking grill of the present invention creates flexibility for consumers to configure several heating features such as direct heating cooking, indirect heating cooking, broiling, or the smoker capability simply by installing heat plates above or below, and by employing wood chips in some configurations. This facility to transform or combine cooking methods on a single DIBS grill is not available using other grills.

OBJECTS OF THE INVENTION

One object of this invention is to provide a cooking apparatus that can be used in an outdoor or commercial grill.

Another object of this invention is to provide a cooking apparatus and method which enables transformation in configuration of its construction to apply direct heating cooking, indirect heating cooking, a broiling (frying, sautéing or baking) feature, or smoking capability, or any combination thereof, during cooking, broiling, smoking, or barbecuing of foods on heat plates or grids, by interchangeably removing or placing the heat plate above, below, or on the same ledge which positions the grid.

Another object of this invention is to provide a cooking apparatus which enables direct heating by installing a removable heat plate on the same ledge on which the grid is positioned, so that the heat emitted from the charcoal, electric, or gas heat source directly cooks the food on the grill.

Another object of this invention is to provide a cooking apparatus which enables indirect heating cooking by installing a removable heat plate underneath the grid and above charcoal, electric, or gas heat source, in which the direct heat emitted from the heat source is mediated into an indirect radiative heat by the positioning of such heat plate.

Another object of this invention is to provide a cooking apparatus which enables a broiling feature by installing a removable heat plate above the grid, in which the heat emitted from the heat plate above the charcoal, electric, or gas heat source broils or fries foods of varying thickness such as meats, poultry, fish, vegetables, and in which the surface of the heat plate prevents any corrosive drippings into the burner or heat source.

Another object of this invention is to provide a cooking apparatus which enables a smoker capability by installing a removable heat plate stored with chips underneath the grid, in which charcoal, electric, or gas heat source emits heat below the heat plate, and the smoke that emanates from the wood chips inserted inside the hollow volume of the heat plate imparts smoke flavors into the food on the grid.

Another object of this invention is to provide a five-walled heat plate for storing food flavoring wood chips so that the heat plate emits smoke from a position immediately below food placed on the grid.

Another object of this invention is to provide one or more deployable dividers that section the cooking surface area of the grill into at least two cooking zones, each zone with its own separate heat plate and grid, which enables the consumer to use more than one type of cooking feature such as direct heating cooking, indirect heating cooking, the broiling feature, or the smoker capability, or all of these methods at the same time, in a multiple grid-and-heat-plate grill setup.

BRIEF DESCRIPTION OF DRAWINGS

These and other features, aspects, and advantages of the present invention will become better understood with regard to the following description, appended claims, and accompanying drawings where:

DETAILED DESCRIPTION

First Preferred Embodiment

Figure 1A:
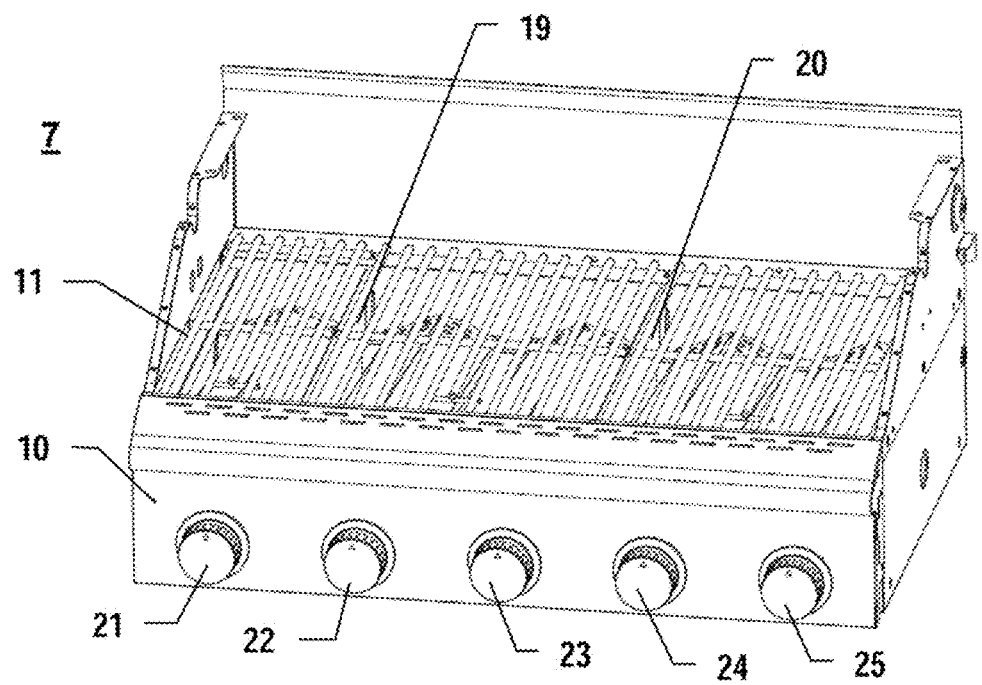
FIG. 1A of the drawings shows a perspective view of a first preferred embodiment of the DIBS cooking grill as it appears from the front, in the direct convective heating configuration.

Referring initially to FIG. 1A, a first preferred embodiment of DIBS grill 7 of the present invention for direct heating cooking (direct convective heat) is shown from the front perspective. For direct heating cooking, this first preferred embodiment of DIBS grill 7 may comprise firebox 10 with at least one grid, amongst multiple grids 11. This preferred embodiment also includes at least one heat plate (not shown), however such heat plate is not directly employed when cooking by direct convective heat. DIBS grill 7 does, however, incorporate components for holding one or more heat plates in position, generally on brackets or shelves (not shown) left of dividers 19-20. FIG. 1A shows other grid zones of DIBS grill 7, where a consumer may also employ other cooking methods, to the right of dividers 19-20 inside firebox 10, as explained more fully later.

Figure 1B:
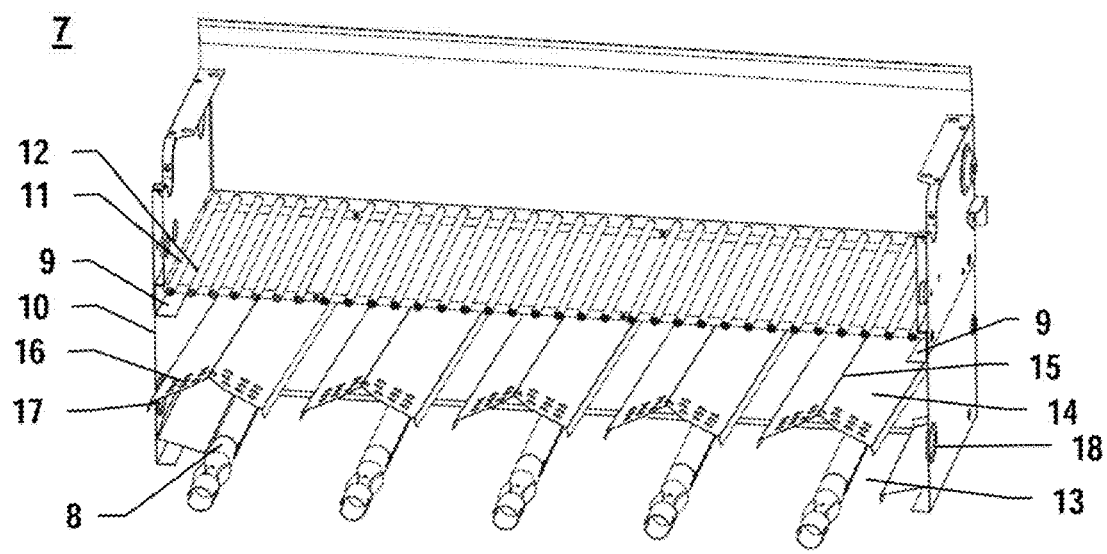
FIG. 1B of the drawings shows a perspective view of a first preferred embodiment of the DIBS cooking grill as it appears from the front, in cross-section, in the direct convective heating configuration.

FIG. 1B illustrates the first preferred embodiment of the DIBS grill 7 of FIG. 1A in cross-section. In this configuration, firebox 10 includes standard burner assembly 8 with at least one of grids 11 and flame tamer 14. Burner assembly 8 is the essential heat source mounted inside firebox interior 13. Burner 8 is typically an elongated, cylindrical shape, though it may be of various shapes and sizes. Burner 8 also typically has at least one gas outlet port and is connected physically to at least one corresponding knob 21. A control panel, having control knobs 21-25, can also include touch pads, or the like, that allow a user of DIBS grill 7 to individually control the temperature of different areas inside firebox 10. Standard burner assembly 8 is positioned at or near the interior of firebox 10 of DIBS grill 7 to create heat evenly throughout firebox 10. Firebox 10 has a horizontally extending combustion chamber 13 with four containment walls and floor (not shown in FIG. 1). Flame tamer 14 is positioned between burner 8 and one of grids 11. Flame tamer 14, or flame spreader, is a heat diffuser, preferably made from stainless steel which is pivotally mounted by one or more first brackets 9 protruding from the interior of at least two vertical side walls on the inside of firebox 10 and below grids 11. In some embodiments, firebox 10 may be supplied with airholes 17-18, through which air may enter firebox 10. Flame tamer 14 is at least as long as grids 11, and it may capture corrosive meat drippings and distribute heat evenly throughout the food on grids 11. The stainless steel metal of flame tamer 14 may be folded into inverted V-tents 15 which may protect burner 8 from grease drippings. Flame tamer 14 also generally contains perforated holes 16 on its horizontal ends in order to allow heat to pass through and diffuse up to the food on grids 11. The combination of inverted V-tents 15 and perforated holes 16 prevent cooking grease from falling directly onto burner 8, and thereby causing flairs which can burn the food and add undesired flavor or smoke the food, and clogging up burner 8 ports, while at the same time spreading heat.

Grids 11 hold the food. Grids 11 extend horizontally and parallel to firebox 10 and are mounted to the walls of firebox 10 by at least one or more brackets or shelves 9 extending from two of the vertical side walls inside firebox 10 and above burner 8. Grids 11 may also be held in place by a shelf (not shown) formed in the interior side walls of firebox 10, or grids 11 may be held in place by other methods. Grids 11 are each comprised of a plurality of horizontal, elongated rail members 12, formed parallel to each other and equally spaced apart. Grids 11 can be made from stainless steel, or cast iron, which can withstand extreme high temperatures, and therefore have a long life span. DIBS grill 7 is fabricated so one or more dividers 19-20 (see FIG. 1A) may be placed under and between one or more grids 11 in firebox 10. Dividers 19-20 section DIBS grill 7 into multiple cooking surface zones, and are secured between two or more separate grids 11, and one or more heat plates (not shown in FIG. 1). DIBS grill 7 may also include one or more u-brackets (not shown) to secure corresponding dividers 19-20 perpendicularly with respect to the horizontally positioned grids 11. Dividers 19-20 can be made from cast iron, stainless, or any other durable and flame-resistant metal. With dividers 19-20, consumers can isolate selected zones of the DIBS grill 7 and restrict mixing of grilling liquids, food seasonings, foods grilled with different cooking methods, and the like, in a multiple grid-and-heat-plate grill arrangement.

Turning now to FIGS. 2A-2D, these figures show various views of heat plate 50 as the active, movable component, by which the cooking method of DIBS grill 7 (see FIG. 1A) is varied. Heat plate 50 is at the heart of the present invention, and it defines DIBS grill's 7 cooking methods for indirect radiative heating cooking, broiling (frying or even sautéing or baking), and smoking (as discussed below as we address those cooking methods). Therefore, one or more heat plates 50 may be stored by the user in prospect of such use, either within another area of the firebox of DIBS grill 7, or separately from DIBS grill 7, when only direct heat is desired.

Heat plate 50 comprises a movable (and removable) metal plate that rests above the burner, at various positions to create various heating effects. Heat plate 50 may be interposed above or below grids 11 of DIBS grill 7, depending on the desired type of cooking configuration. Heat plate 50 is typically rectangular and elongated in shape, and like grids 11, extends horizontally across firebox 10. Heat plate 50 is generally as long and as wide as grids 11 in order to maximize its heating effects, which include dispersing heat evenly to all zones of the cooking surface of firebox 10. A useful dimension for the surface area of heat plate 50 is 12-inches by 17.5-inches and 6-inches by 17.5-inches, however, depending generally on the size of firebox 10 of DIBS grill 7 or grids 11, heat plate 50 may be larger or smaller than those dimensions. Heat plate 50 is generally made from washable, stainless steel, porcelain, porcelain coated, anodized stainless steel, or other heat resistant materials, which allow resistance to extreme, high temperatures. These materials also are conductive to vaporization of meat drippings, so that the drippings do not build up on heat plates 50.

Figure 2A:
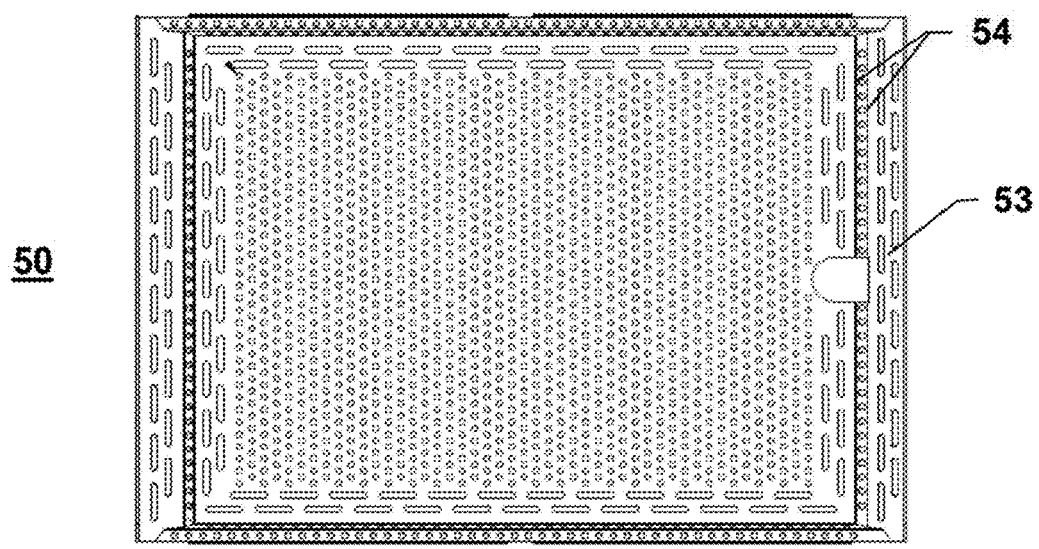
FIG. 2A of the drawings shows a top view of the heat plate of the present invention.

FIG. 2A illustrates heat plate 50 from a top-down, or aerial, view. The surface area of heat plate 50, in one preferred embodiment, forms a generally flat surface having a plurality of circular or elongated perforations 51, or holes, which may be formed generally in equally spaced, parallel or staggered rows that extend horizontally across the face of heat plate 50. Holes 51 allow heat to rise through heat plate 50, and distribute, whilst forming a barrier between the burner and grid to protect the burner from corrosive food drippings and prevent grease from catching fire and burning the food which can add undesired flavor or smoke to the food.

Figure 2B:
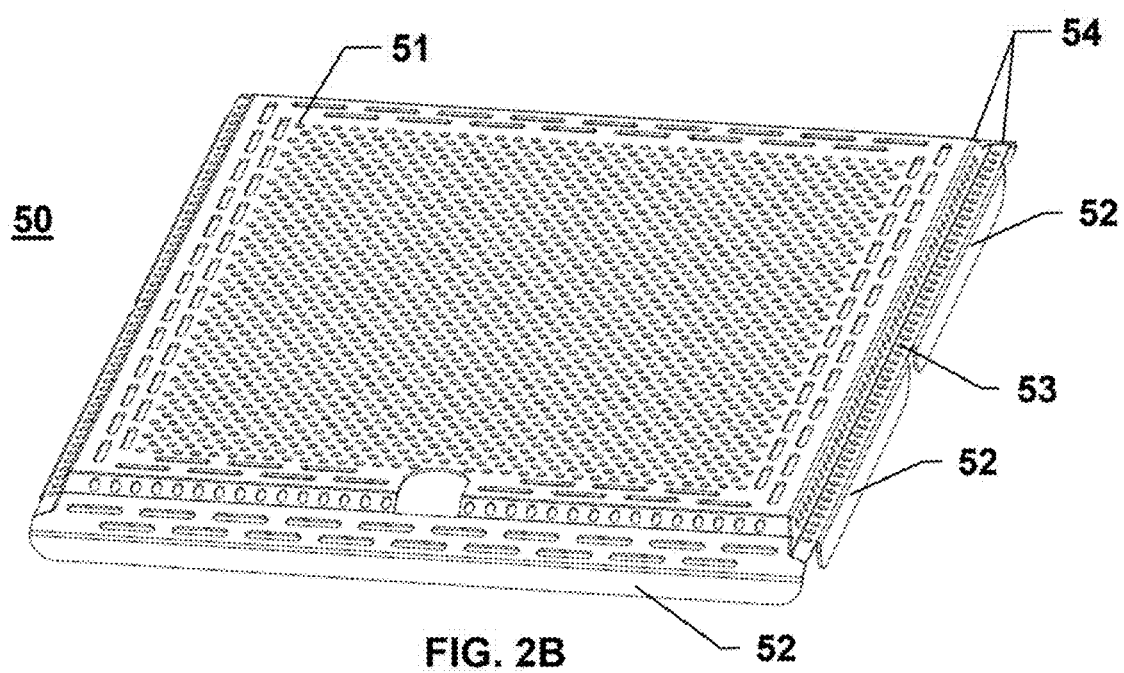
FIG. 2B of the drawings shows a perspective view of the heat plate of the present invention.

FIG. 2B shows a bottom view of heat plate 50, in perspective, in which we may see the flat surface of heat plate 50 that is continuously bordered with raised, bent edges 52 with their own additional holes. Edges 52 are bent at precise angles and shapes in order to allow a user to accomplish various functions. For example, one or more bends along opposing edges 52 of heat plate 50 allow heat plate 50 to be dropped into position, and thereby held in place, within firebox 10 of DIBS grill 7. Ledges formed in the interior sides of the firebox, or on brackets (not shown) affixed to the sides of firebox 10, can hold the metal of edges 52 of heat plate 50 as it sits on such ledges or brackets. The ledges or brackets formed in the interior of the side walls of firebox 10 may be the same ledges or brackets upon which grids 11 of DIBS grill 7 sit for its support. In this first position, heat plate 50 can sit directly below grids 11, and at a distance from grids 11 ("the heat plate depth") sufficient to accomplish the purposes set forth below. The angle of bends 54 at the opposing edges 52 of heat plate 50, and the width and depth of supporting edge "sills" 53 created by bends 54 along edges 52 of heat plate 50, govern the "heat plate depth." So long as the heat plate depth is generally at least sufficient to accomplish the various cooking methods described below, the shape of the supporting sills may therefore vary, both in the angle of bends 54 and the width of heat plate 50 sills 53. Heat plate 50 may also be positioned on ledges or brackets separated from grids 11 supports, however such positioning changes the functioning of heat plate 50 within the DIBS grill 7.

Bent edges 52 formed in heat plate 50 also allow the user to accomplish other functions, such as creating a volume within which wood chips may be held under grids 11. One or more bends 54 along one or more bent edges 52 of heat plate 50 allow heat plate 50, in conjunction with supporting sills 53, to create such volume. Edges 52 and sills 53 of heat plate 50 may then extend between and beyond (above) the rail members of grids 11, thereby creating separate zones on and above grids 11 for cooking using different methods. Two sills 53 along opposing sides of heat plate 50 and edges 52, which are at least as deep as the plate depth, and two additional sills 53 along the remaining two sides of heat plate 50, create a volume within which wood chips can be stored for smoking foods.

The periphery of heat plate 50 may be formed with holes 51 which can be increased in size or elongated, generally for the purpose of allowing more convective heat to move through the plane occupied by heat plate 50. Such holes 51 allow the heat to rise through edges 52 of heat plate 50 as well, in order to distribute heat optimally, while forming a barrier between burner 8 (not shown, see FIG. 1A) and grids 11 to protect burner 8 from food drippings and prevent grease from catching fire and burning the food which can add undesired flavor or smoke to the food. Brackets or shelves 9 formed in the interior side walls of firebox 10 can hold heat plate 50 in place.

Figure 2C:
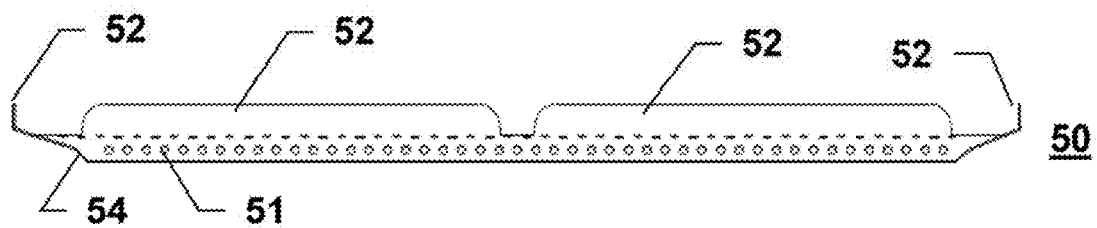
FIG. 2C of the drawings shows a side view of the heat plate of the present invention.
Figure 2D:
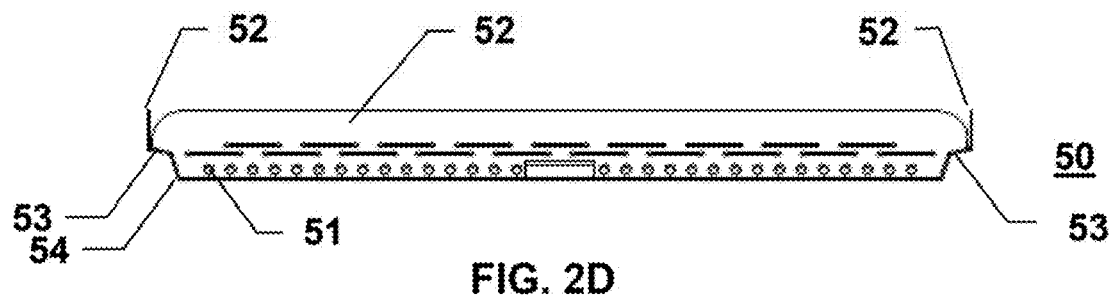
FIG. 2D of the drawings shows an end view of the heat plate of the present invention.

FIG. 2C shows another view of heat plate 50, a side view along the length (front to back in DIBS grill 7) of edges 52 of heat plate 50. FIG. 2C and FIG. 2D together show the plate depth of heat plate 50. As noted above, plate depth is determined largely by the height of sills 53 above the main body of heat plate 50 created by edge bends 54. The thickness of heat plate 50 is typically within the range of one to two millimeters, though heat plate 50 may be considerably thicker to hold more heat, or use coatings of various materials, or increase the rigidity of heat plate 50. Heat plate 50 may also be thinner than this range so long as heat plate 50 is capable of holding its own weight within firebox 10 (not shown, see FIG. 1A). The manufacturer can vary the thickness of heat plate 50, depending on the optimal desired effect given the cooking method at hand, such effects including conducting and dispersing heat evenly throughout DIBS grill 7.

FIG. 2D shows another view of heat plate 50, an end view along the width of edges 52 of heat plate. FIG. 2C and FIG. 2D together also show some of holes 51 formed in the body, edges 52, and sills 53 of heat plate 50.

Heat plate 50 is stored away for a direct convective heating set up, or when DIBS grill 7 is not in use, since direct heating requires convection to directly heat the food. However, the user may use one or more heat plates 50 in some portions of DIBS grill 7, when multiple cooking methods are desirable, while dispensing with heat plates 50 for direct convective cooking in other portions of DIBS grill 7, as we explain below.

Second Preferred Embodiment

Figure 3A:
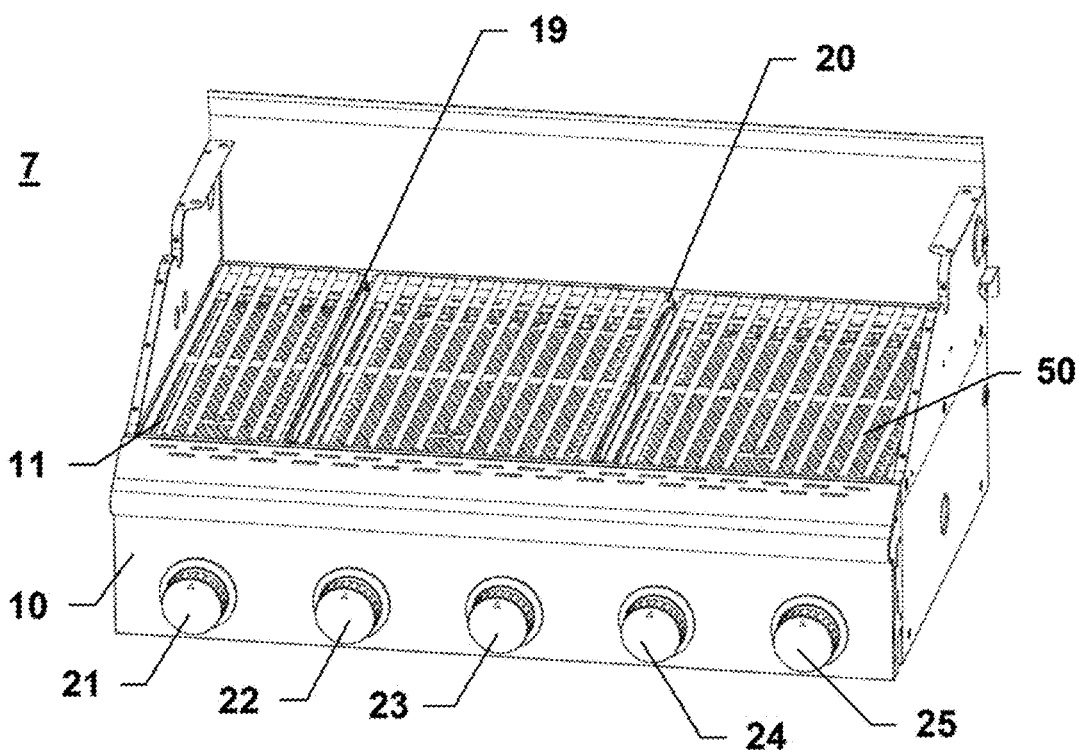
FIG. 3A of the drawings shows perspective view of the same first preferred embodiment shown in FIGS. 1A and 1B of the DIBS cooking grill, as it appears from the front, in the indirect radiative heating configuration.
Figure 3B:
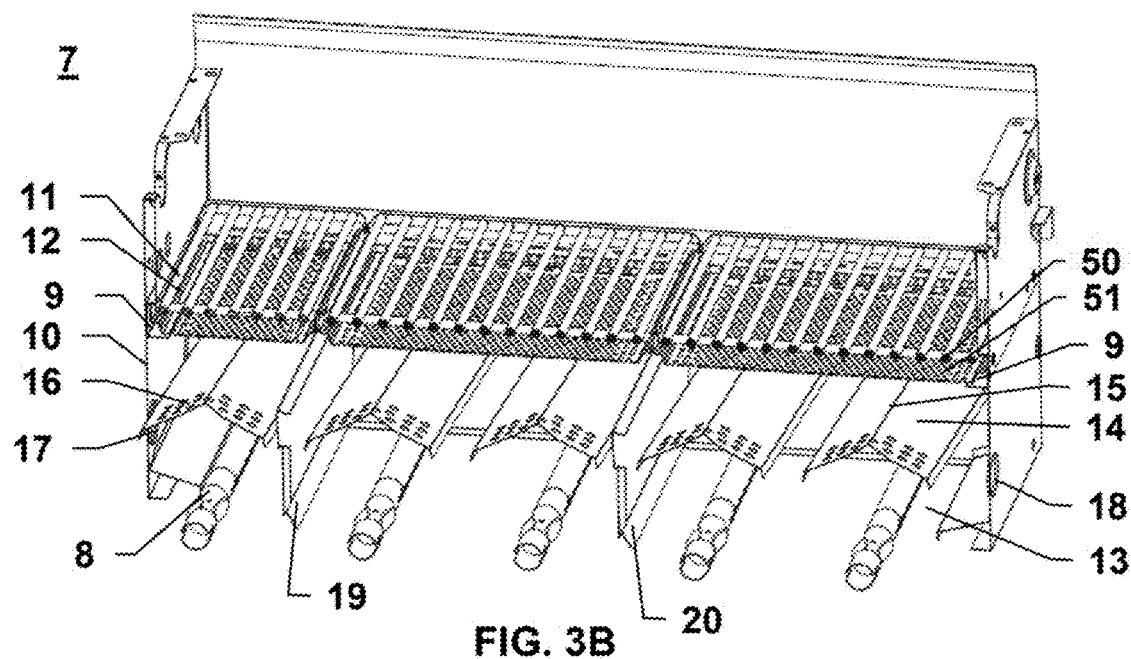
FIG. 3B of the drawings shows perspective view of the same first preferred embodiment shown in FIGS. 1A and 1B and of the DIBS cooking grill, as it appears from the front, in cross-section, in the indirect radiative heating configuration.
Figure 3C:
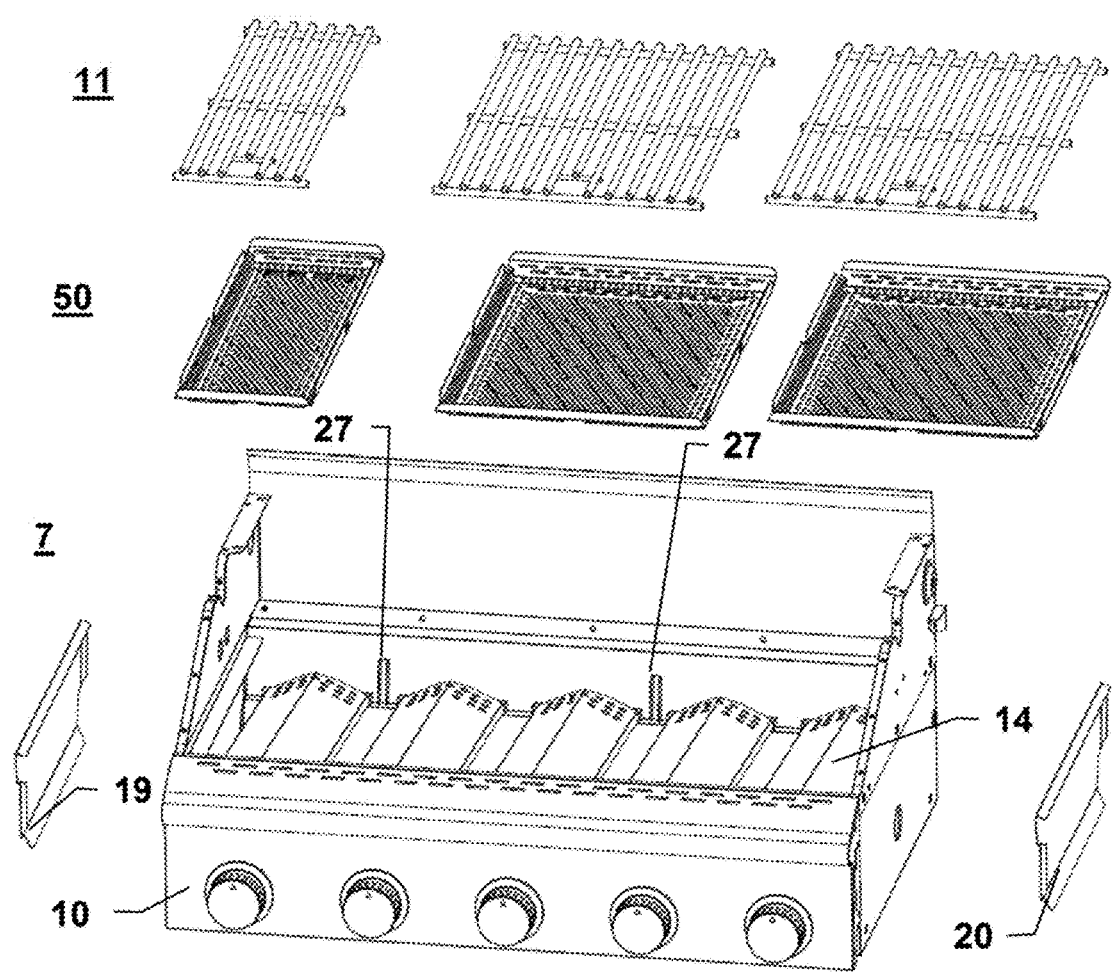
FIG. 3C of the drawings shows perspective view of the same first preferred embodiment shown in FIGS. 1A and 1B and of the DIBS cooking grill, as it appears from the front, in exploded view in the indirect radiative heating configuration.

Referring now to FIGS. 3A-3C, a second preferred embodiment of DIBS grill 7 for indirect heating cooking (indirect radiative heating cooking) is shown in perspective view from the front (shown in FIG. 3A) and in cross-section (shown in FIG. 3B), and in exploded view (shown in FIG. 3C). From the front perspective, FIG. 3A illustrates this second preferred embodiment which may comprise firebox 10 with at least one grid, amongst multiple grids 11, at least one heat plate 50 installed below grid 11, and may also include dividers 19-20. Heat plate 50 is the main component that defines DIB grill's 7 current cooking method. In this configuration, DIBS grill 7 incorporates methods for holding one or more heat plates 50 in position, generally on brackets or shelves 9 left of divider 19-20. FIG. 3A also shows other grid zones of DIBS grill 7, where a consumer may also employ other cooking methods, to the right of divider 19-20 inside firebox 10, as explained more fully later.

FIG. 3B illustrates this second preferred embodiment of DIBS grill 7 of FIG. 3A in cross-section. Like the configuration in FIGS. 1A-1B, firebox 10 includes standard burner assembly 8 with at least one of grids 11 and flame tamer 14. Standard burner assembly 8 is positioned at or near the bottom of interior 13 of firebox 10 of DIBS grill 7 to create heat evenly throughout firebox 10. Burner 8 is typically an elongated, cylindrical shape, though it may be of various shapes and sizes. Burner 8 also typically has at least one gas outlet port and is connected physically to at least one corresponding knob 21. A control panel, having control knobs 21-25 (see FIG. 3A), can also include touch pads, or the like, that allow a user of DIBS grill 7 to individually control the temperature of different areas inside firebox 10. Firebox 10 has a horizontally extending combustion chamber 13 with four containment walls and floor (not shown in FIG. 3A). Flame tamer 14 is positioned between burner 8 and one of grids 11. Flame tamer 14, or flame spreader, is a heat diffuser, preferably made from stainless steel which is pivotally mounted by one or more first brackets 9 protruding from the interior of at least two of the vertical side walls on the inside of firebox 10 and below grids 11. In some embodiments, firebox 10 may be supplied with airholes 17-18, through which air may enter firebox 10. Flame tamer 14 is at least as long as grids 11, and it may capture corrosive meat drippings and distribute heat evenly throughout the food on grids 11. The stainless steel metal of flame tamer 14 may be folded into inverted V-tents 15 which may protect burner 8 from grease drippings. Flame tamer 14 also generally contains perforated holes 16 on its horizontal ends in order to allow heat to pass through and diffuse up to the food on grids 11. The combination of inverted V-tents 15 and perforated holes 16 prevent cooking grease from falling directly onto burner 8, and thereby causing flairs which can burn the food and add undesired flavor or smoke to the food, and clogging up burner 8 ports, while at the same time spreading heat.

Grids 11 hold the food. Grids 11 extend horizontally and parallel to firebox 10 and is mounted to the walls of firebox 10 by at least one or more brackets or shelves 9 extending from two of the vertical side walls inside firebox 10 and above burner 8. Grids 11 may also be held in place by a shelf (not shown) formed in the interior side walls of firebox 10, or grids 11 may be held in place by other methods. Grids 11 are each comprised of a plurality of horizontal, elongated rail members 12, formed parallel to each other and equally spaced apart. Grids 11 can be made from stainless steel, or cast iron, which can withstand extreme high temperatures, and therefore have a long life span. DIBS grill 7 is fabricated so one or more dividers 19-20 may be placed under and between one or more grids 11 in firebox 10. Dividers 19-20 section DIBS grill 7 into multiple cooking surface zones, and are secured between two or more separate grids 11, and one or more heat plates 50. DIBS grill 7 may also include one or more u-brackets (not shown) to secure corresponding dividers 19-20 perpendicularly with respect to the horizontally positioned grids 11. Dividers 19-20 can be made from cast iron, stainless, or any other durable and flame-resistant metal. With dividers 19-20, consumers can isolate selected zones of DIBS grill 7 and restrict mixing of grilling liquids, food seasonings, foods grilled with different cooking methods, and the like, in a multiple grid-and-heat-plate grill arrangement.

As we noted above, heat plate 50 is the main component that defines DIBS grill's 7 current cooking method. Heat plate 50 is designed and configured in the same way as noted above in FIGS. 2A-2D. However, installment of heat plate 50 under grids 11, open side up, allows the consumer to add a second heat conductive layer to disperse heat evenly across grids 11 and more evenly throughout DIBS grill 7, all whilst preventing the grease from catching fire and burning the food which can add undesired flavor or smoke to the food. Heat plate 50 of DIBS grill 7, which defines DIBS grill's 7 current cooking method, extends horizontally across firebox 10, as long and as wide as grids 11, in order to bring heat evenly, and generally at lower temperatures, to all zones of the cooking surface of grids 11. In this position, heat plate 50 is held in place by one or more separate brackets or shelves 9 which extend from the side walls inside firebox 10 and below grids 11 and at the heat plate depth. In another preferred embodiment of heat plate 50, heat plate 50 sits on the same bracket or shelf 9 which holds grid 50 in place. This position allows heat plate 50 to sit at one distance below grids 11, at the heat plate depth. Heat plate 50 above burner 8 below grids 11 allows the convection of the heat to cook the food which is not directly above burner 8, as heat circulates around heat plate 50 to the food. When preparing for cooking, heat plate 8 is positioned below grids 11, with heat plate sills 53 (not shown, see FIG. 2B), on the appropriate preformed brackets or shelves 9. The food is then placed on grids 11, and the heat source is ignited. Heat from the heat source convects from burner 8 to heat plate 50, which, because it is heated by such convection, radiates heat in turn upward and toward grids 11 and food. The surface area of heat plate 50, in one preferred embodiment, forms a generally flat surface having a plurality of circular or elongated holes 51, which may be formed generally in equally spaced, parallel or staggered rows that extend horizontally across the face of heat plate 50. Holes 50 allow the heat to rise through heat plate 50, and distribute heat, whilst forming a barrier between burner 8 and grids 11 to protect burner 8 from corrosive food drippings and prevent grease from catching fire and burning the food which can add undesired flavor or smoke to the food.

FIG. 3C illustrates this second preferred embodiment of DIBS grill 7 of FIG. 3A in an exploded view with separate components to be assembled together. Grids 11 are positioned above heat plate 50 which is then positioned above burner 8 which is situated at the bottom or near firebox 10 of DIBS grill 7. The next component is flame tamer 14 which is positioned between burner 8 (not shown, see FIG. 3A) and grids 11. Flame tamer 14, or flame spreader, is a heat diffuser, preferably made from stainless steel which is pivotally mounted by one or more first brackets (not shown) protruding from the interior of at least two of the vertical side walls on the inside of firebox 10 and below grids 11. DIBS grill 7 is fabricated so one or more dividers 19-20 may be placed between one or more grids 11. U-brackets 27 are fastened against the interior side walls of the grill body to secure dividers 19-20 in place. Dividers 19-20, section DIBS grill 7 into multiple cooking surface zones, and are secured between two or more separate grids 11, and one or more heat plates 50.

Third Preferred Embodiment

Figure 4A:
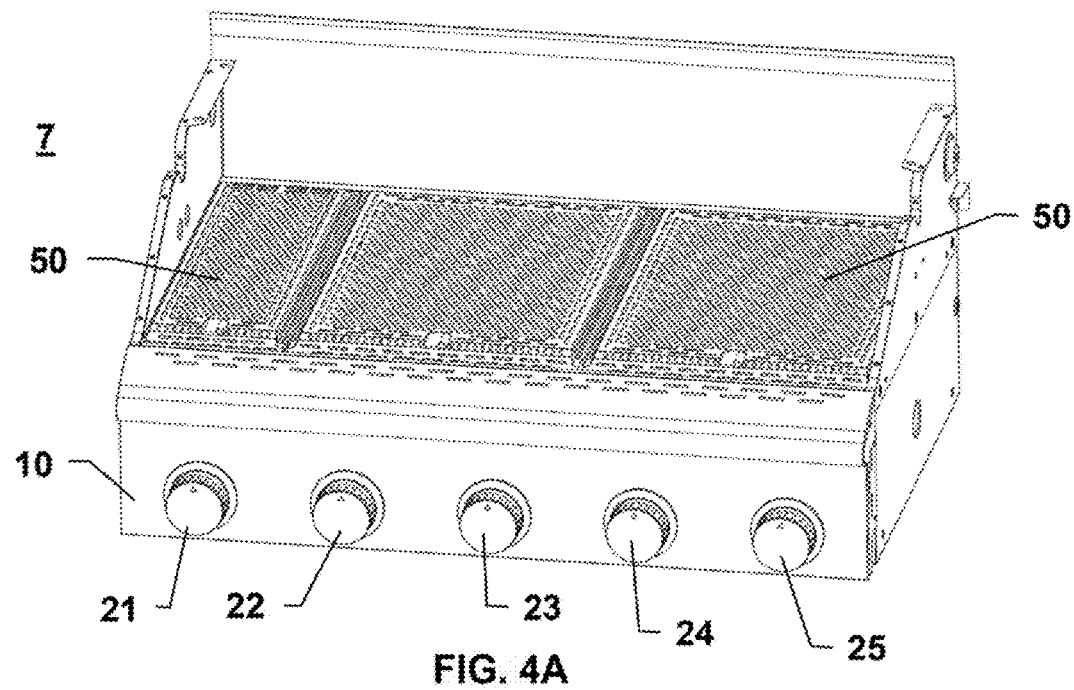
FIG. 4A of the drawings shows perspective view drawings of the same first preferred embodiment shown in FIGS. 1A and 1B of the DIBS cooking grill, as it appears from the front, in the direct radiative heating (or broiling) configuration.

Turning to FIG. 4A, the third preferred embodiment of DIBS grill 7 for broiling (direct radiative heating) is shown front the front, in perspective view. FIG. 4A illustrates this third preferred embodiment which may comprise standard burner assembly 8 with at least one grid, amongst multiple grids, 11 (not shown, see FIG. 4B), at least one heat plate 50 installed above grids 11, and may also include dividers 19-20 (see FIG. 4B). Heat plate 50 is the main component that defines the grill's current cooking method. In this configuration, DIBS grill 7 incorporates methods for holding one or more heat plates 50 in position, generally nesting on grids 11, which in turn rest on brackets or shelves 9 (not shown). FIG. 4A also shows other grid zones of DIBS grill 7, where a consumer may also employ other cooking methods, to the right of divider 19-20 inside firebox 10, as explained more fully later.

Figure 4B:
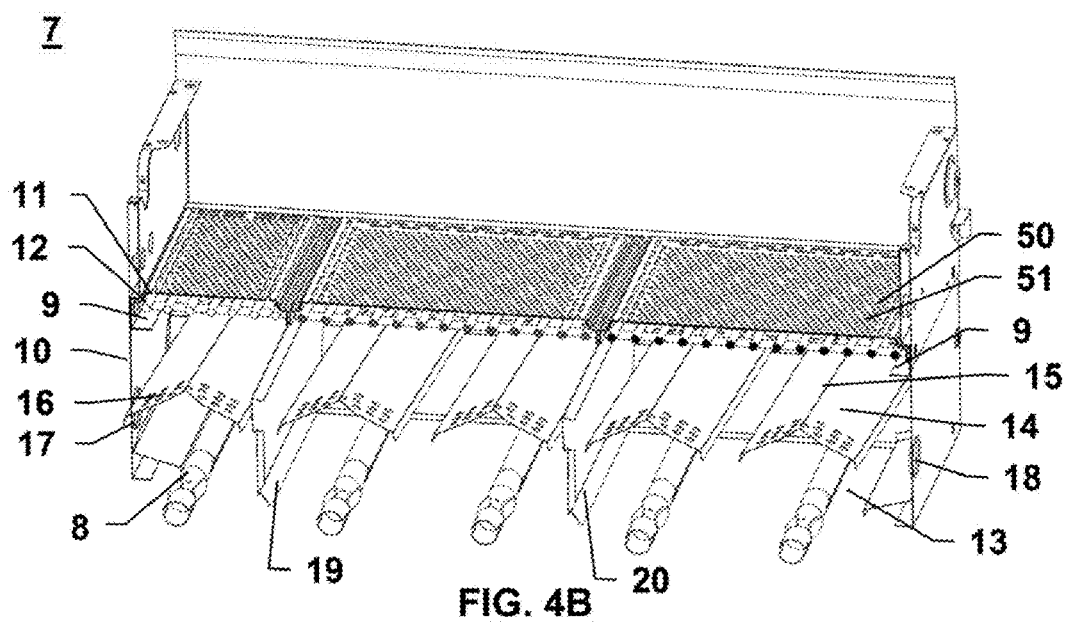
FIG. 4B of the drawings shows perspective view drawings of the same first preferred embodiment shown in FIGS. 1A and 1B of the DIBS cooking grill, as it appears from the front, in cross-section, in the direct radiative heating (or broiling) configuration.

FIG. 4B illustrates the third preferred embodiment of DIBS grill 7 of FIG. 4A in cross-section. Like the configuration in FIGS. 1A-1B, 10 includes standard burner assembly 8 with at least one of grids 11 and flame tamer 14. Standard burner assembly 8 is positioned at or near the bottom of interior 13 of firebox 10 of DIBS grill 7 to create heat evenly throughout firebox 10. Burner 8 is typically an elongated, cylindrical shape, though it may be of various shapes and sizes. Burner 8 also typically has at least one gas outlet port and is connected physically to at least one corresponding knob 21. A control panel, having control knobs 21-25, can also include touch pads, or the like, that allow a user of DIBS grill 7 to individually control the temperature of different areas inside firebox 10. Standard burner assembly 8 is positioned at or near the bottom of interior 13 of firebox 10 of DIBS grill 7 to create heat evenly throughout firebox 10. Firebox 10 has a horizontally extending combustion chamber 13 with four containment walls and floor (not shown in FIG. 3A). Flame tamer 14 is positioned between burner 8 and one of grids 11. In some embodiments, firebox 10 may be supplied with airholes 17-18, through which air may enter firebox 10. Flame tamer 14 is at least as long as grids 11, and it may capture corrosive meat drippings and distribute heat evenly throughout the food on grids 11. The stainless steel metal of flame tamer 14 may be folded into inverted V-tents 15 which may protect burner 8 from grease drippings. Flame tamer 14 also generally contains perforated holes 16 on its horizontal ends in order to allow heat to pass through and diffuse up to the food on grids 11. The combination of inverted V-tents 15 and perforated holes 16 prevent cooking grease from falling directly onto burner 8, and thereby causing flairs and burning the food which can add undesired flavor or smoke to the food, and clogging up burner 8 ports, while at the same time spreading heat.

Grids 11 hold the food. Grids 11 extend horizontally and parallel to firebox 10 and is mounted to the walls of firebox 10 by at least one or more brackets or shelves 9 extending from two of the vertical side walls inside firebox 10 and above burner 8. Grids 11 may also be held in place by a shelf (not shown) formed in the interior side walls of firebox 10, or grids 11 may be held in place by other methods. Grids 11 are each comprised of a plurality of horizontal, elongated rail members 12, formed parallel to each other and equally spaced apart. Grids 11 can be made from stainless steel, or cast iron, which can withstand extreme high temperatures, and therefore have a long life span. DIBS grill 7 is fabricated so one or more dividers 19-20 may be placed under and between one or more grids 11 in firebox 10. Dividers 19-20 section DIBS grill 7 into multiple cooking surface zones, and are secured between two or more separate grids 11, and one or more heat plates 50. DIBS grill 7 may also include one or more u-brackets (not shown) to secure corresponding dividers 19-20 perpendicularly with respect to the horizontally positioned grids 11. Dividers 19-20 can be made from cast iron, stainless, or any other durable and flame-resistant metal. With dividers 19-20, consumers can isolate selected zones of DIBS grill 7 and restrict mixing of grilling liquids, food seasonings, foods grilled with different cooking methods, and the like, in a multiple grid-and-heat-plate grill arrangement.

As we noted above, heat plate 50 is the main component that defines DIBS grill's 7 current cooking method. Heat plate 50 is designed and configured in the same way as noted above in FIGS. 2A-2D. However, installment of heat plate 50 directly above grids 11, open side down, in a position to hold the cooking food, allows the consumer to cook a variety of foods, while eliminating the need of an additional grill topper accessory for this function. Heat plate 50 of DIBS grill 7, which defines DIBS grill's 7 current cooking method, extends horizontally across firebox 10, generally as long and as wide as grids 11 upon which heat plate 50 sits, in order to bring heat evenly to all zones of the cooking surface, since heat plate 50 has been turned upside down, heat plate 50 is now the upper cooking surface sitting on grids 11. In this position, heat plate 50 is held in place by the upper surfaces of grids 11. In another preferred embodiment, heat plate 50 may sit on the same bracket or shelf 9 which holds grids 11 in place. Either of these positions allows heat plate 50 to sit at distance above grids 11, holding the cooking food, at the heat plate depth above grids 11, or above or below heat plate depth above grids 11. Heat plate 50 above grids 11 allows the convection of the heat through grids 11, and to heat plate 50, to cook food which resides directly on heat plate 50. Again, heat may circulate around heat plate 50 to the food. When preparing for cooking, heat plate 50 is positioned above grids 11, with heat plate sills 53 residing on two edges of grids 11, or on the preformed brackets or shelves which hold grids 11. The food is then placed on heat plates 50, and the heat source is ignited. Broiling typically exposes food to direct radiative heating when the heat from a heat source, such as gas, directly heats the food from above grids 11. However, broiling may also involve high, intense heat coming from a source directly in contact with the food. In this case, that source is heat plate 50, which in turn has been heated by burner 8. Similar to frying food, broiling rapidly heats the surface of the food, when heat plate 50 emits a considerable amount of heat by direct contact and by radiation. Installment of heat plate 50 above grids 11 eliminates the need for grill toppers because it prevents smaller food items from falling through grids 11 while providing heat to cook a variety of food items, including breakfast foods, vegetables and seafood. The surface area of heat plate 50, in one preferred embodiment, forms a generally flat surface having a plurality of circular or elongated holes 51 formed generally in equally spaced, parallel or staggered rows that extend horizontally across the face of heat plate 50. Holes 51 allow the heat to rise through heat plate 50, and distribute heat, whilst forming a barrier between burner 8 and grids 11 to protect burner 8 from corrosive food drippings and prevent grease from catching fire and burning the food which can add undesired flavor or smoke to the food.

Fourth Preferred Embodiment

Figure 5A:
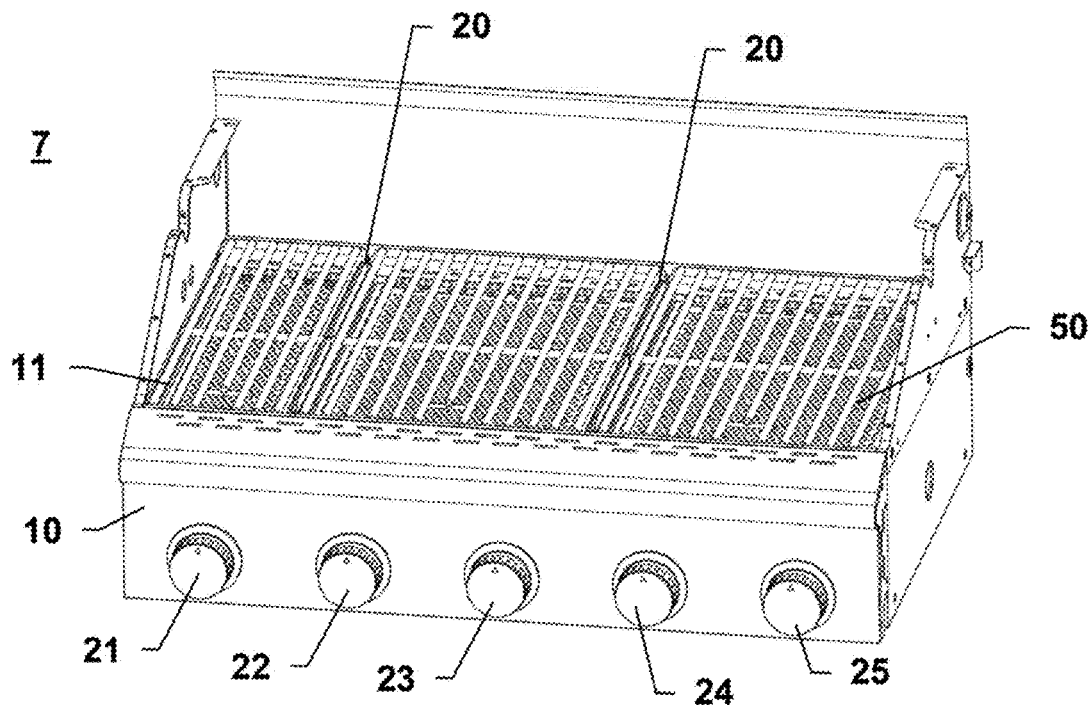
FIG. 5A of the drawings shows perspective view drawings of the same first preferred embodiment of the DIBS cooking grill, as it appears from the front, in the smoking configuration.
Figure 5B:
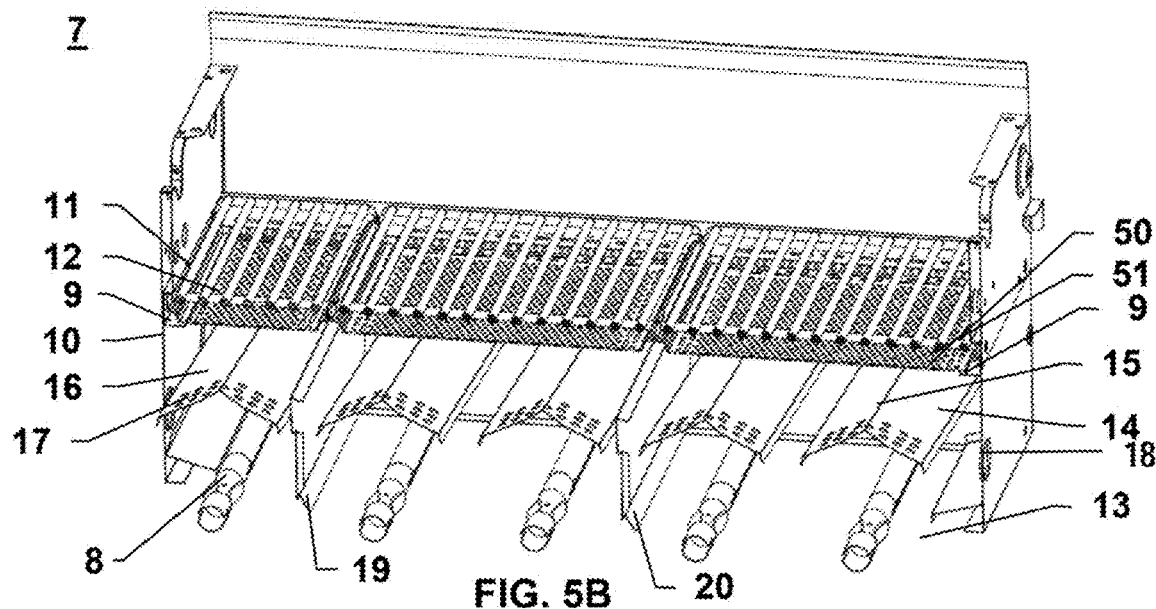
FIG. 5B of the drawings shows perspective view drawings of the same first preferred embodiment of the DIBS cooking grill shown in FIGS. 1A and 1B, as it appears from the front, in cross-section, in the smoking configuration.

FIGS. 5A-5B shows the fourth preferred embodiment of DIBS grill 7 for smoking as shown from the front perspective. FIG. 5A illustrates this fourth preferred embodiment in which DIBS grill 7 may comprise firebox 10 with at least one grid, amongst multiple grids, 11, and at least one heat plate 50 with stored wood chips (not shown) which may be installed below grids 11 and may also include dividers 19-20. Heat plate 50 is the main component that defines DIB grill's 7 current cooking method. In this configuration, DIBS grill 7 incorporates methods for holding one or more heat plates 50 in position, generally on brackets or shelves 9 (not shown, see FIG. 5B) left of divider 19-20. FIG. 5A also shows other grid zones of DIBS grill 7, where a consumer may employ dividers 19-20 for other cooking methods, to the right of divider 19-20 inside firebox 10, as explained more fully later.

FIG. 5B illustrates the fourth preferred embodiment of DIBS grill 7 of FIG. 5A in cross-section. Like the configuration in FIGS. 1A-1B, firebox 10 includes standard burner assembly 8 with at least one of grids 11 and flame tamer 14. Standard burner assembly 8 is positioned at or near the bottom of interior 13 of firebox 10 of DIBS grill 7 to create heat evenly throughout firebox 10. Burner 8 is typically an elongated, cylindrical shape, though it may be of various shapes and sizes. Burner 8 also typically has at least one gas outlet port and is connected physically to at least one corresponding knob 21. A control panel, having control knobs 21-25, can also include touch pads, or the like, that allow a user of DIBS grill 7 to individually control the temperature of different areas inside firebox 10. Standard burner assembly 8 is positioned at or near the bottom of interior 13 of firebox 10 of DIBS grill 7 to create heat evenly throughout firebox 10. Firebox 10 has a horizontally extending combustion chamber 13 with four containment walls and floor (not shown in FIG. 5A). In some embodiments, firebox 10 may be supplied with airholes 17-18, through which air may enter the firebox 10. Flame tamer 14 is at least as long as grids 11, and it may capture corrosive meat drippings and distribute heat evenly throughout the food on grids 11: The stainless steel metal of flame tamer 14 may be folded into inverted V-tents 15 which may protect burner 8 from grease drippings. Flame tamer 14 also generally contains perforated holes 16 on its horizontal ends in order to allow heat to pass through and diffuse up to the food on grids 11. The combination of inverted V-tents 15 and perforated holes 16 prevent cooking grease from falling directly onto burner 8, and thereby causing flairs and burning the food which can add undesired flavor or smoke to the food, and clogging up burner 8 ports, while at the same time spreading heat.

Grids 11 hold the food. Grids 11 extend horizontally and parallel to firebox 10 and is mounted to the walls of firebox 10 by at least one or more brackets or shelves 9 extending from two of the vertical side walls inside firebox 10 and above burner 8. Grids 11 may also be held in place by a shelf (not shown) formed in the interior side walls of firebox 10, or grids 11 may be held in place by other methods. Grids 11 are each comprised of a plurality of horizontal, elongated rail members 12, formed parallel to each other and equally spaced apart. Grids 11 can be made from stainless steel, or cast iron, which can withstand extreme high temperatures, and therefore have a long life span. DIBS grill 7 is fabricated so one or more dividers 19-20 may be placed under and between one or more grids 11 inside firebox 10. Dividers 19-20 section DIBS grill 7 into multiple cooking surface zones, and are secured between two or more separate grids 11, and one or more heat plates 50. DIBS grill 7 may also include one or more u-brackets (not shown) to secure corresponding dividers 19-20 perpendicularly with respect to the horizontally positioned grids 11. Dividers 19-20 can be made from cast iron, stainless, or any other durable and flame-resistant metal. With dividers 19-20, consumers can isolate selected zones of DIBS grill 7 and restrict mixing of grilling liquids, food seasonings, foods grilled with different cooking methods, and the like, in a multiple grid-and-heat-plate grill arrangement.

Heat plate 50, which for smoking is again turned over, so that its open side is up and facing grids 11 above, again defines DIBS grill's 7 current cooking method. Heat plate 50 is designed and configured in the same way as noted above in FIGS. 2A-2D. However, heat plate 50 of DIBS grill's 7 cooking method, with its two bent edges 52 at least as deep as the heat plate depth along the remaining two sides of heat plate 50, create volume for storage of wood chips, and define DIBS grill's 7 current cooking method. Heat plate 50, extends horizontally across firebox 10, generally as long and as wide grids 11, in order to bring heat evenly to all zones of the cooking surface of grids 11 and again generally at lower temperatures, to all zones of the cooking surface of the grids 11. In this position, heat plate 50 is held in place by one or more separate brackets or shelves 9 which extend from the interior side walls inside firebox 10 and below grids 11 and approximately at the heat plate depth. In another preferred embodiment of heat plate 50, heat plate 50 sits on the same shelf bracket or shelf (not shown) which holds grids 11 in place. This position allows heat plate 50 to sit at one distance below grids 11, at the heat plate depth, so that sufficient wood chips may be held in the volume created between the main body of heat plate 50 and grids 11, and the smoke produced by the wood chips inside heat plate 50 may rise up through grids 11 and around the food supported thereby to efficiently smoke the food. Heat released from the burner directly below heat plate 50 causes smoking particles to ignite and smolder. During this process, the smoke flavors the food being cooked on DIBS grill 7. Heat plate 50 extends horizontally across firebox 10, and is as long and as wide as grids 11 under which it sits, in order to disperse heat and smoke evenly throughout the cooking surface area of grids 11. The same bracket or shelf (not shown) which holds grids 11 in place may also hold heat plate 50. Wood chips are placed on heat plate 50 and when the heat source ignites, the released heat from burner 8 directly below heat plate 50 causes smoking particles from the wood chips to ignite and smolder. The smoke then flavors the food being cooked on DIBS grill 7. Heat plate 50 is specifically designed to limit the amount of airflow entering the enclosure in order to restrict oxygen to the smoking wood chips. This restriction of oxygen causes the smoking wood chips to produce more smoke over a longer period of time. Heat plate 50 may vary in opening size, wall thickness, and material composition, which all play a role in determining the duration and amount of smoke that is released from heat plate 50. The surface area of heat plate 50, in one preferred embodiment, forms a generally flat surface having a plurality of circular or elongated holes 51, formed generally in equally spaced, parallel or staggered rows that extend horizontally across the face of heat plate 50. Holes 51 allow the heat to rise through heat plate 50, and distribute heat, whilst forming a barrier between burner 8 and grids 11 to protect burner 8 from corrosive food drippings and prevent grease from catching fire and burning the food which can add undesired flavor or smoke to the food.

Figure 6A:
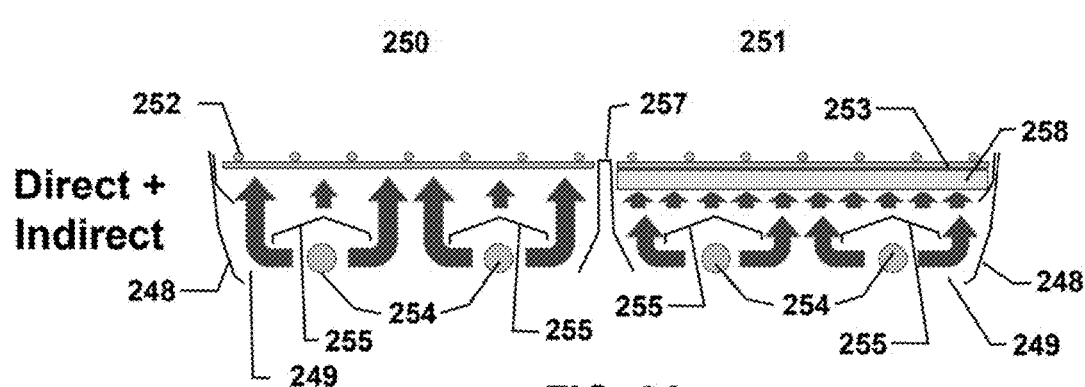
FIG. 6A of the drawings shows diagrammatically a first possible combination of cooking methods using the same first preferred embodiment of the DIBS cooking grill shown in FIGS. 1A and 1B, using the direct radiative heating configuration to the left of a single divider, and using the indirect heating configuration to the right of the same divider.
Figure 6B:
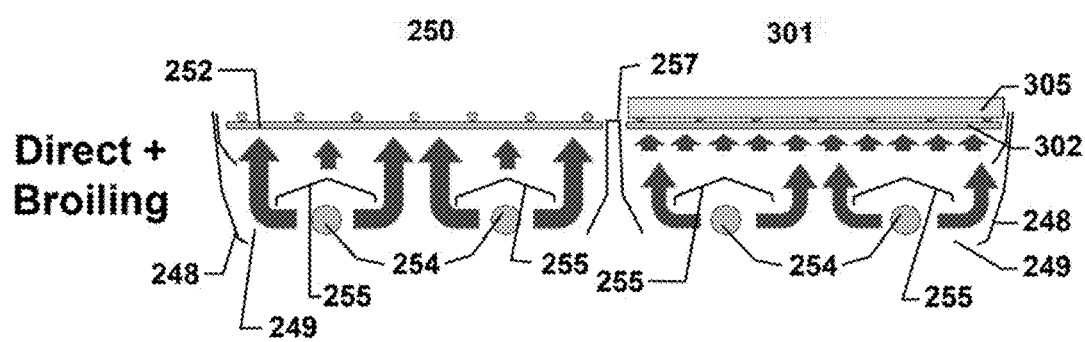
FIG. 6B of the drawings shows diagrammatically a second possible combination of cooking methods using the same first preferred embodiment of the DIBS cooking grill shown in FIGS. 1A and 1B, using the direct radiative heating configuration to the left of a single divider, and using the broiling heating configuration to the right of the same divider.
Figure 6C:
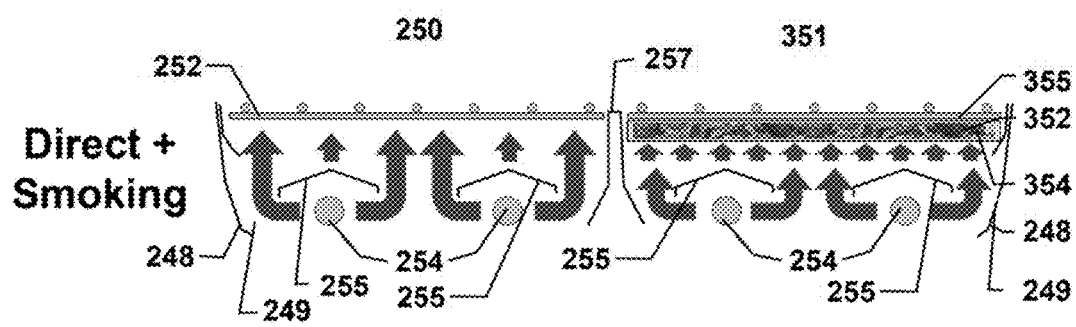
FIG. 6C of the drawings shows diagrammatically a third possible combination of cooking methods using the same first preferred embodiment of the DIBS cooking grill shown in FIGS. 1A and 1B, using the direct radiative heating configuration to the left of a single divider, and using the smoking configuration to the right of the same divider.

Now moving on to FIGS. 6A-6C, these figures illustrate schematically at least six possible set-up combinations utilizing the direct convective heating cooking, and other methods users may apply with the DIBS grill seen in previous figures. The versatile DIBS grill can utilize at any given time any of the following features: direct convective heating cooking, indirect radiative heating cooking, broiling, and the smoker capability. The DIBS grill is fabricated so one or more dividers 257 (not shown in FIG. 6) may be placed between one or more grids 252-253 to emphasize the separation between cooking zones and, in some cases, support heat plate 258. The DIBS grill may also include one or more u-brackets (not shown) fastened into the interior sidewalls of firebox 248, or to its interior bottom, to secure corresponding dividers 257 vertically in proper fixed relationship to grids 252-253 (i.e. perpendicular to horizontally positioned grids 252-253). Dividers 257 are secured between two or more separate grids 252-253, and one or more heat plates 258, to section the grill into multiple cooking surface zones. Dividers 257 can be made from cast iron, stainless, or any other durable and flame-resistant metal.

FIG. 6A illustrates the cooking grill to be configured with at least two grilling zones adapted to direct convective heating cooking and indirect radiative heating cooking. The cooking grill in this configuration includes at least one divider 257 which sections the DIBS grill into two cooking zones 250-251, secured between left grid 252 and right grid 253. Left zone 250 of divider 257 utilizes the direct heating set-up whereas right zone 251 of divider 257 utilizes the indirect heating set-up. By employing grids 252-253 and heat plates 258 of different sizes, and adjusting dividers 257 as desired, cooking zones left 250 and right 251 can be of different sizes. In left zone 250 of divider 257, the cooking grill includes, in this FIG. 6A, standard burner assemblies 254 within interior 249 of the exterior walls of firebox 248 and flame tamer 255, and at least one grid 252. On left side 250 of divider 257, the direct heating cooking set-up does not use a heat plate because food is cooked directly above heat source burner assembly 254. The heat is carried upwards from the heat source to the food that is being grilled. Air acts as a carrier for the heat transfer. Natural or forced convection circulate the heat upwards to cook the food, thereby allowing constantly heated air directly rising from the heat source to cook the food by circulating the heat evenly through grid 252 and within the grill.

In right zone 251 of the divider 257, the cooking grill includes standard burner assemblies 254 within firebox 248, flame tamer 255, at least one grid 253, and at least one heat plate 258 installed below grid 253 for this indirect radiative heating cooking set-up. The placement of heat plate 258 below grid 253 on the right side of the grill allows indirect heating cooking, as much of the heat produced from burners 254 is directed to heat plate 258, which then indirectly heats the food above. Indirect radiative heating cooking requires heat plate 258 be placed between the food and burners 254, thereby acting as a physical barrier which reduces the intensity of the heat. Heat from a heat source, such as charcoal, electric, or gas, thereby proceeds by convection to and around heat plate 258. Heat from heat plate 258 then radiates upward, as the primary means to transfer heat upward to cook the food. By allowing the heat source to indirectly heat the food, the intensity of the heat is reduced as heat plate 258 absorbs the heat from the heat source, at which point much of the heat transferred by convection is transformed to radiation. Heat plate 258 then radiates the collected heat, and disperses heat to its surroundings, including the food above.

The absence of heat plate 258 in left zone 250 of the grill allows direct convective cooking. Alternatively, left grid 252 can be configured to use indirect heating cooking, and right grid 253 can be configured to use direct heating cooking, by merely moving heat plate 258 from its position in right zone 251 of the grill to a comparable position in left zone 250 of the grill, and adjusting divider 257 between left 250 and right zones 251 as necessary. Using this configuration of the multiple grid-and-heat plate DIBS grill, consumers simultaneously can cook their foods in one cooking zone 250 using direct heating cooking, while cooking in cooking zone 251 using indirect heating cooking on the other side of divider 257.

FIG. 6B illustrates the configuration of the cooking grill with two grilling zones adapted to direct convective heating cooking and broiling (direct radiative heating). The cooking grill in this configuration may include again at least one divider 257 which sections the DIBS grill into two cooking zones 250 and 301, secured between left grid 252 and right grid 302. Left zone 250 of divider 257 utilizes the direct heating set-up whereas right zone 301 of divider 257 utilizes the broiling set-up. By employing grids 252 and 302 and heat plate 305 of different sizes, and adjusting dividers 257 as desired, the cooking zones left and right can be of different sizes. In left zone 250 of divider 257, the cooking grill includes, in this FIG. 6B, standard burner assemblies 254 within interior 249 of the exterior walls of firebox 248 and flame tamer 255, and at least two grids 252 and 302. In left zone 250 of divider 257, the direct heating cooking set-up does not use a heat plate because food is cooked directly above heat source burner assembly 254. The heat is carried upwards from the heat source to the food that is being grilled. Air acts as a carrier for the heat transfer. Natural or forced convection circulates the heat upwards to cook the food, thereby allowing constantly heated air directly rising from the heat source to cook the food by circulating the heat evenly through grid 252 and within the grill. Left zone 250 of divider 257 utilizes the direct heating set-up whereas right zone 301 of divider 257 utilizes the broiling set-up.

In right zone 301 of divider 257, the cooking grill includes, in this FIG. 6B, standard burner assemblies 254 within interior 249 of the exterior walls of firebox 248 and flame tamer 255, at least one grid 302, and at least one heat plate 305 installed above grid 302 for this broiling set-up. The heat from a heat source such as charcoal, electric, or gas directly heats the food on heat plate 305 waste above grid 302. Broiling exposes food to direct radiative heating, or heating by direct contact between heat plate 305 and the food, using high, intense heat coming from heat plate 305.

The absence of heat plate 305 in left zone 250 of the grill allows direct convective cooking. Alternatively, left grid can 252 be configured to use broiling, and right grid 302 can be configured to use direct convective heating cooking, merely by moving heat plate 305 from its position in right zone 301 of the grill to a comparable position in left zone 250 of the grill, and adjusting divider 257 between left 250 and right zone 301 as necessary.

Using this configuration of the multiple grid-and-heat plate DIBS grill, consumers simultaneously can cook their foods in cooking zone 250 using direct heating cooking, while cooking in cooking zone 301 using broiling on the other side of divider 257.

FIG. 6C illustrates the configuration of the DIBS cooking grill to include at least two grilling zones adapted to direct convective heating cooking and smoking (smoker capability). The cooking grill in this configuration includes at least one divider 257 which sections the DIBS grill into two cooking zones 250 and 351, secured between left grid 252 and right grid 355. Left zone 250 of divider 257 utilizes the direct heating set-up whereas right zone 351 of divider 257 utilizes the indirect heating set-up shown in FIG. 6A, but with wood chips plated in the volume created by heat plate 354. By employing grids 252 and 355 and heat plates 354 of different sizes, and adjusting dividers 257 as desired, the cooking zones left 250 and right 301 can be of different sizes. In left zone 250 of divider 257, the cooking grill, in this FIG. 6C, includes standard burner assemblies 254 within interior 249 of the exterior walls of firebox 248 and flame tamer 255, and at least one grid 252. In left zone 250 of divider 257, the direct heating cooking set-up does not use a heat plate because food is cooked directly above heat source burner assembly 254. The heat is carried upwards from the heat source to the food that is being grilled. Air acts as a carrier for the heat transfer. Natural or forced convection circulates the heat upwards to cook the food, thereby allowing constantly heated air directly rising from the heat source to cook the food by circulating be heat evenly through grid 252 and within the grill.

In right zone 351 of divider 257, the cooking grill, in this FIG. 6C, includes standard burner assemblies 254 within interior 249 of the exterior walls of firebox 248, flame tamer 255, at least one grid 355, and at least one heat plate 354, with wood chips 352, positioned below grid 355. Wood chips 352 are laid on heat plate 354 which is then placed beneath grid 355. Smoking is a form of indirect heating so food is placed next to, but not generally directly above, the heat source burner assembly 254 because of the physical barrier created by heat plate 354 with stored wood chips 352 in between the food and burners 254. The heat released from burner 254 directly below heat plate 354 circulates upward towards heat plate 354 and causes wood chips 352 on heat plate 354 to ignite and smolder. During this process, the smoke flavors the food being cooked on the grill. Heat plate 354 with stored wood chips 352 is designed to restrict oxygen by limiting airflow entering the enclosure which causes smoking wood chips 352 to produce more smoke over a longer period of time without ignition.

The absence of heat plate 354 in left zone 250 of the grill allows direct convective cooking. Alternatively, grid 252 can be configured to use smoking, and right grid 253 can be configured to use direct heating cooking, merely by moving heat plate 354 from its position in right zone 351 of the grill to a comparable position in left zone 250 of the grill, and adjusting divider 257 between left 250 and right zone 351 as necessary. Using this configuration of the multiple grid-and-heat plate DIBS grill, consumers simultaneously can cook their foods in one cooking zone 250 using direct heating cooking, while cooking in cooking zone 351 using smoking on the other side of divider 257.

Figure 7A:
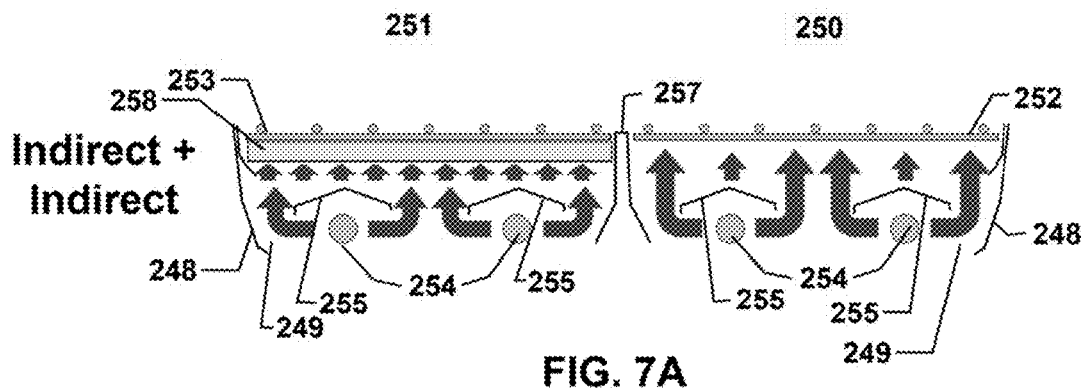
FIG. 7A of the drawings shows diagrammatically a fourth possible combination of cooking methods using the same preferred embodiment of the DIBS cooking grill shown in FIGS. 1A and 1B, using the indirect radiative heating configuration to the left of a single divider, and using the indirect heating configuration to the right of the same divider.
Figure 7B:
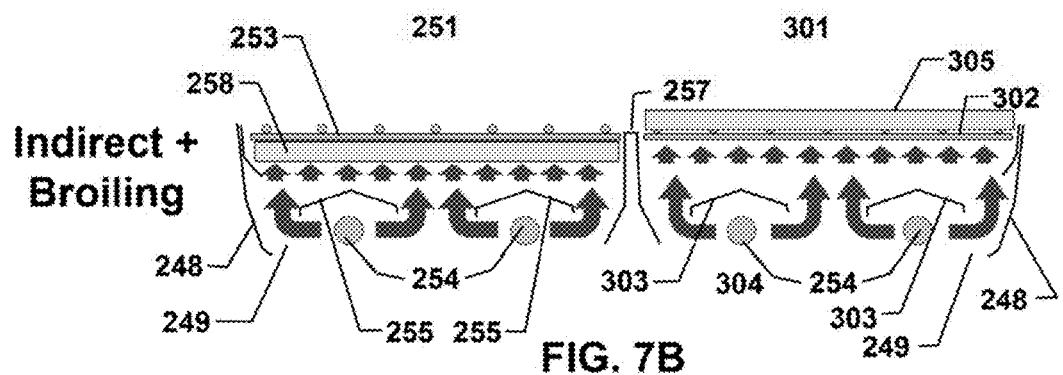
FIG. 7B of the drawings shows diagrammatically a fifth possible combination of cooking methods using the same preferred embodiment of the DIBS cooking grill shown in FIGS. 1A and 1B, using the indirect radiative heating configuration to the left of a single divider, and using the broiling. heating configuration to the right of the same divider.
Figure 7C:
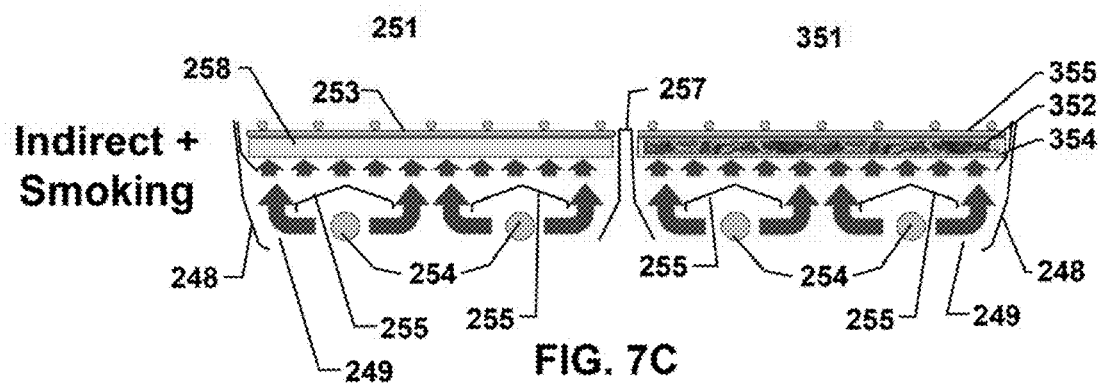
FIG. 7C of the drawings shows diagrammatically a sixth possible combination of cooking methods using the same preferred embodiment of the DIBS cooking grill shown in FIGS. 1A and 1B, using the indirect radiative heating configuration to the left of a single divider, and using the smoking configuration to the right of the same divider.

Now turning to FIGS. 7A-7C, these figures illustrate schematically at least six additional, possible set-up combinations utilizing the indirect radiative heating cooking, and other cooking methods users may apply with the DIBS grill seen in previous figures. Consumers can use divider 257 to isolate selected zones of the cooking grill at any given time to set up any one of the following cooking methods, or combinations of these cooking methods: directive convective heating cooking, indirect radiative heating cooking, broiling, and smoking (smoker capability). The DIBS grill is fabricated so one or more dividers 257 may be placed under one or more grids 252-253. The DIBS grill also includes one or more u-brackets (not shown) fastened into the interior sidewalls of firebox 248, or to its interior bottom, to secure corresponding dividers 257 vertically in proper fixed relationship to grids 252-253 (i.e. perpendicular to horizontally positioned grids 252-253). Dividers 257 are secured between two or more separate grids 252-253, and one or more heat plates 259, to section the grill into multiple cooking surface zones. Dividers 257 can be made from cast iron, stainless, or any other durable and flame-resistant metal.

FIG. 7A illustrates the cooking grill which is configured to have at least two grilling zones adapted to indirect radiative heating cooking and direct convective heating cooking. The cooking grill in this configuration may include at least one divider 257 which sections the DIBS grill into two cooking zone 250-251, secured between left grid 253 and right grid 252. Left zone 251 of divider 257 utilizes the indirect heating set-up whereas right zone 250 of divider 257 utilizes the direct heating set-up. By employing grids 252-253 and heat plates 258 of different sizes, and adjusting dividers 257 as desired, the cooking zones left and right can be of different sizes.

In left zone 251 of divider 257, the cooking grill includes standard burner assemblies 254 within interior 249 of exterior walls of firebox 248, flame tamer 255, at least one grid 253, and at least one heat plate 258 installed below grid 253 for this indirect radiative heating cooking set-up. The placement of heat plate 258 below grid 253 on left side 251 of the grill allows indirect heating cooking, as much of the heat produced from burners 254 is directed to heat plate 258 which then indirectly heats the food above. Indirect radiative heating cooking requires heat plate 258 be placed between the food and burners 254, thereby acting as a physical barrier which reduces the intensity of the heat. Heat from one of these heat sources radiates upward as the air acts as a carrier for the heat transfer. Natural or forced convection circulates the heat upward to cook the food. Heat from a heat source, such as charcoal, electric, or gas, thereby proceeds by convection to and around heat plate 258. By allowing the heat source to indirectly heat the food, the intensity of the heat is reduced as heat plate 258 absorbs the heat from the heat source, at which point the convection of heat transforms to radiation. Heat plate 258 then radiates the collected heat from the heat source and disperses it to its surroundings, including the food above.

In right zone 250 of divider 257, the cooking grill includes standard burner assemblies 254 within interior 249 of the exterior walls of firebox 248 and flame tamer 255, and at least one grid 252. In right zone 250 of divider 257, the direct heating cooking set-up does not use a heat plate because food is cooked directly above heat source burner assembly 254. The heat is carried upwards from the heat source to the food that is being grilled. Air acts as a carrier for the heat transfer. Natural or forced convection circulates the heat upwards to cook the food, thereby allowing constantly heated air directly rising from the heat source to cook the food by circulating the heat evenly through grid 252 and within the grill.

The absence of a heat plate in right zone 250 of the grill allows direct convective cooking. Alternatively, left grid 253 can be configured to use direct heating cooking and right grid 252 can be configured to use indirect heating cooking, merely by moving heat plate 258 from its position in right zone 250 of the grill to a comparable position in left zone 251 of the grill, and adjusting divider 257 between left 251 and right zone 250 as necessary. Using this configuration of the multiple grid-and-heat plate DIBS grill, consumers simultaneously can cook their foods in cooking zone 251 using indirect heating cooking, while cooking in cooking zone 250 using direct heating cooking on the other side of divider 257.

FIG. 7B illustrates a cooking grill configuration having at least two grilling zones adapted to indirect radiative heating cooking and broiling. In left zone 251 of divider 257, the cooking grill includes standard burner assemblies 254 within interior 249 of the exterior walls of firebox 248, flame tamer 255, at least one grid 253, and at least one heat plate 258 installed below grid 253 for this indirect radiative heating cooking set-up. The placement of heat plate 258 below grid 253 on left side 251 of the grill allows indirect heating cooking, as much of the heat produced from burner 254 is directed to heat plate 258 which then indirectly heats the food above. Indirect radiative heating cooking requires heat plate 258 be placed between the food and burners 254, thereby acting as a physical barrier which reduces the intensity of the heat. Natural or forced convection circulates heat upward from a heat source, such as charcoal, electric, or gas, by convection to and around heat plate 258. Heat from heat plate 258 then radiates upward to supply most of the heat to cook the food. By allowing the heat source to indirectly heat the food, the intensity of the heat is reduced as heat plate 258 absorbs the heat from the heat source, at which point the convection of heat transformed to radiation. Heat plate 258 then radiates the collected heat from the heat source and disperses it to its surroundings, including the food above.

In right zone 301 of divider 257, the cooking grill includes standard burner assemblies 254 within interior 249 of firebox 249 and flame tamer 255, at least one grid 302, and at least one heat plate 305 installed above grid 302 for this broiling set-up. The heat from a heat source such as charcoal, electric, or gas, travels through grid 302 to directly heat heat plate 305 positioned above grid 302. Broiling exposes food to direct radiative heating, or heating by direct contact between heat plate 305 and the food, using high, intense heat coming from heat plate 305.

Alternatively, left grid 253 can be configured to use broiling and right grid 302 can be configured to use indirect heating cooking, merely by adjusting heat plate 305 in their respective positions in left zone 251 of the grill and right zone 301 of the grill to employ a specific method of cooking, and adjusting divider 257 between left zone 251 and right zone 301 as necessary. Using this configuration of the multiple grid-and-heat plate DIBS grill, consumers simultaneously can cook their foods in cooking zone 251 using indirect heating cooking, while cooking in cooking zone 301 using broiling on the other side of divider 257.

FIG. 7C illustrates a DIBS cooking grill configuration having at least two grilling zones adapted to indirect radiative heating cooking and smoking. In left zone 251 of divider 257, the cooking grill includes a standard burner assemblies 254 within interior 249 of the exterior walls of firebox 248, flame tamer 255, at least one grid 253, and at least one heat plate 258 installed below grid 253 for this indirect radiative heating cooking set-up. The placement of heat plate 258 below grid 253 in left zone 251 of the grill allows indirect heating cooking, as much of the heat produced from the burner is directed to heat plate 258 which then indirectly heats the food. Indirect radiative heating cooking requires heat plate 258 be placed between the food and burners 254, thereby acting as a physical barrier which reduces the intensity of the heat. Heat from a heat source, such as charcoal, electric, or gas, proceeds by convection to and around heat plate 258. Heat from heat plate 258 then radiates upward to cook the food. By allowing the heat source to indirectly heat the food, the intensity of the heat is reduced as heat plate 258 absorbs the heat from the heat source, at which point the convected heat is transformed to radiation. Heat plate 258 then radiates the collected heat from the heat source and disperses it to its surroundings.

In right zone 351 of divider 257, the cooking grill includes standard burner assemblies 254 within interior 249 of the exterior walls of firebox 248, flame tamer 255, at least one grid 355, and at least one heat plate 354, with wood chips 352, positioned below grid 355. Wood chips are laid on the heat plate which is then placed beneath the grid. Smoking is a form of indirect heating so food is placed next to, but not generally directly above, the heat source because of the physical barrier created by heat plate 354 with stored wood chips 352 in between the food and the heat source. The heat released from burner 356 directly below heat plate 354 circulates upward towards heat plate 354 and causes wood chips 352 on heat plate 354 to ignite and smolder. During this process, the smoke flavors the food being cooked on the grill. Heat plate 354 with stored wood chips 352 is designed to restrict oxygen by limiting airflow entering the enclosure which causes smoking wood chips 352 to produce more smoke over a longer period of time without ignition.

Alternatively, left zone 251 can be configured to use smoking and right zone 351 can be configured to use indirect heating cooking, merely by adjusting heat plate 257 in their respective positions in left zone 251 of the grill and right zone 351 of the grill to employ a specific method of cooking, and adjusting divider 257 between left zone 251 and right zone 351 as necessary. Using this configuration of the multiple grid-and-heat plate DIBS grill, consumers simultaneously can cook their foods in cooking zone 251 using indirect heating cooking, while cooking in cooking zone 351 using smoking on the other side of divider 257.

SEQUENCE LISTING

Not Applicable.

What is claimed is:

1. A heat plate, formed of heat resistant material, having a generally flat and planar main body that has at least two bent edges along substantially opposing sides thereof, the bent edges forming at least two supporting heat plate edge sills, the bent edges creating a plate depth between the heat plate main body and the heat plate sills, such that when the heat plate is positioned on a horizontal grid within a firebox of a grill on the heat plate sills, a uniform plate depth is formed between the main body and the grid, either over or under the grid.

2. The heat plate of claim 1, in which the main body of the heat plate is formed with holes therethrough.

3. The heat plate of claim 2, in which the holes in the main body of the heat plate are sufficient in area to allow heat to pass therethrough.

4. The heat plate of claim 1, in which the uniform plate depth between the main body of the heat plate and the grid is sufficient to hold wood chips when the heat plate is positioned within a firebox.

5. A cooking grill comprising:
a firebox having a combustion chamber, and a burner assembly positioned within the combustion chamber of the firebox,
a first grid positioned above the burner assembly,
a heat plate having a generally flat and planar main body, the main body having at least two bent edges along substantially opposing sides thereof forming at least two supporting heat plate edge sills, the heat plate positioned above the burner assembly in parallel relationship either over or under a horizontal grid within the firebox of the grill, with uniform plate depth between the main body and the grid,
wherein
the interior of the firebox is formed with first means for holding the grid, and
the interior of the firebox is formed with second means for holding the heat plate.

6. The cooking grill of claim 5, in which the first means for holding the grid is the same as the second means for holding the heat plate.

7. The cooking grill of claim 5, in which the heat plate is formed of heat resistant material, the bent edges creating a plate depth between the heat plate main body and the heat plate sills, wherein the heat plate sills are used to position the heat plate within the firebox of the grill.

8. The cooking grill of claim 7, further comprising a second grid positioned above the burner assembly, the grill having means for holding the second grid within the interior of the firebox.

9. The cooking grill of claim 8, further comprising a removable divider for sectioning the grill into one or more cooking surface zones, wherein
the divider is secured substantially under and substantially between the first grid and the second grid, and
the heat plate is positioned on one side of the divider.

10. A method of assembling a cooking grill, comprising the steps of:
securing a removable grid horizontally on mounting means near the top edge of a firebox of the grill, and
securing a removable heat plate having a generally flat and planar main body, on mounting means near the top edge of a firebox of the grill such that the main body is in parallel relationship to the removable grid, with uniform plate depth between the main body and the grid,
wherein the main body has at least two bent edges along substantially opposing sides thereof forming at least two supporting heat plate edge sills.

11. The method of assembling a cooking grill of claim 10, in which the position of the removable grid once it is secured on mounting means near the top edge of the firebox is above the position of the removable heat plate once it is secured on mounting means near the top edge of the firebox.

12. The method of assembling a cooking grill of claim 10, in which the position of the removable heat plate once it is secured on mounting means near the top edge of the firebox is above the position of the removable grid once it is secured on mounting means near the top edge of the firebox.

13. A method of assembling a cooking grill, comprising the steps of:
securing a removable divider within a firebox of the grill, securing a first removable grid horizontally on a first mounting means near the top edge of the firebox on a first side of the grill, securing a removable heat plate having a generally flat and planar main body under and in parallel relationship to the first removable grid, with uniform plate depth between the main body and the first removable grid, wherein the main body has at least two bent edges along substantially opposing sides forming at least two supporting heat plate edge sills, and securing a second removable grid on a second mounting means near the top edge of the firebox on a second side of the grill.

14. A method of assembling a cooking grill, comprising the steps of:

securing a removable divider within a firebox of the grill, securing a first removable grid horizontally on a first mounting means near the top edge of the firebox on a first side of the grill, securing a removable heat plate having a generally flat and planar main body over and in parallel relationship to the first removable grid, with uniform plate depth between the main body and the first removable grid, wherein the main body has at least two bent edges along substantially opposing sides forming at least two supporting heat plate edge sills, and securing a second removable grid on a second mounting means near the top edge of the firebox on a second side of the grill.

15. A method of assembling a cooking grill, comprising the steps of:

securing a removable divider within a firebox of the grill, securing a first removable grid horizontally on a first mounting means near the top edge of the firebox on a first side of the grill, securing a removable heat plate having a generally flat and planar main body under and in parallel relationship to the first removable grid, with uniform plate depth between the main body and the first removable grid, in which the main body of the heat plate is formed thick enough to hold wood chips when the heat plate is positioned within a firebox, wherein the main body has at least two bent edges along substantially opposing sides forming at least two supporting heat plate edge sills, and securing a second removable grid on a second mounting means near the top edge of the firebox on a second side of the grill.

16. A method of assembling a cooking grill, comprising the steps of:

securing a removable divider within a firebox of the grill, securing a first removable grid horizontally on a first mounting means near the top edge of the firebox on a first side of the grill, securing a removable heat plate having a generally flat and planar main body over and in parallel relationship to the first removable grid, with uniform plate depth between the main body and the first removable grid, wherein the main body has at least two bent edges along substantially opposing sides forming at least two supporting heat plate edge sills, securing a second removable grid on a second mounting means near the top edge of the firebox on a second side of the grill, and securing a removable heat plate under the second removable grid.

17. A method of assembling a cooking grill, comprising the steps of:

securing a removable divider within a firebox of the grill, securing a first removable grid horizontally on a first mounting means near the top edge of the firebox on a first side of the grill, securing a removable heat plate having a generally flat and planar main body under and in parallel relationship to the first removable grid, with uniform plate depth between the main body and the first removable grid, which the main body of the heat plate is formed thick enough to hold wood chips when the heat plate is positioned within a firebox, wherein the main body has at least two bent edges along substantially opposing sides forming at least two supporting heat plate edge sills, securing a second removable grid on a second mounting means near the top edge of the firebox on a second side of the grill, and securing another removable heat plate under the second removable grid.

* * * * *